US011736697B2

(12) United States Patent
Zhang et al.

(10) Patent No.: US 11,736,697 B2
(45) Date of Patent: Aug. 22, 2023

(54) CROSS-COMPONENT ADAPTIVE LOOP FILTER

(71) Applicants: Beijing Bytedance Network Technology Co., Ltd., Beijing (CN); Bytedance Inc., Los Angeles, CA (US)

(72) Inventors: Li Zhang, San Diego, CA (US); Weijia Zhu, San Diego, CA (US); Kai Zhang, San Diego, CA (US); Hongbin Liu, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/732,692

(22) Filed: Apr. 29, 2022

(65) Prior Publication Data

US 2022/0272389 A1    Aug. 25, 2022

Related U.S. Application Data

(63) Continuation of application No. PCT/CN2020/124700, filed on Oct. 29, 2020.

(30) Foreign Application Priority Data

Oct. 29, 2019   (WO) ................ PCT/CN2019/113955

(51) Int. Cl.
*H04N 19/82*   (2014.01)
*H04N 19/17*   (2014.01)
(Continued)

(52) U.S. Cl.
CPC ............. *H04N 19/132* (2014.11); *H04N 9/77* (2013.01); *H04N 19/117* (2014.11);
(Continued)

(58) Field of Classification Search
CPC .... H04N 19/82; H04N 19/117; H04N 19/132; H04N 19/136; H04N 19/17; H04N 9/77; H04N 19/70
See application file for complete search history.

(56) References Cited

U.S. PATENT DOCUMENTS

| 9,077,998 B2 | 7/2015 | Wang et al. |
| 9,247,258 B2 | 1/2016 | Coban et al. |

(Continued)

FOREIGN PATENT DOCUMENTS

| AU | 2020337712 A1 | 4/2022 |
| CN | 109479130 A | 3/2019 |

(Continued)

OTHER PUBLICATIONS

Chien W TW-201743619 translated Dec. 2017 (Year: 2017).*

(Continued)

*Primary Examiner* — Zaihan Jiang
(74) *Attorney, Agent, or Firm* — Perkins Coie LLP

(57) ABSTRACT

A method of video processing includes making a determination for a conversion between a video region of a video and a bitstream representation of the video to use a cross-component adaptive loop filtering (CC-ALF) tool for refining chroma samples values using luma sample values; and performing the conversion based on the determination, wherein the refining includes correcting the chroma sample values using a final refinement that is a further refinement of a first refinement value determined by selectively filtering the luma sample values.

15 Claims, 19 Drawing Sheets

(51) Int. Cl.
  *H04N 19/117* (2014.01)
  *H04N 19/132* (2014.01)
  *H04N 19/136* (2014.01)
  *H04N 9/77* (2006.01)
  *H04N 19/186* (2014.01)
  *H04N 19/70* (2014.01)
  *H04N 19/80* (2014.01)

(52) U.S. Cl.
  CPC ........... *H04N 19/136* (2014.11); *H04N 19/17* (2014.11); *H04N 19/186* (2014.11); *H04N 19/70* (2014.11); *H04N 19/80* (2014.11); *H04N 19/82* (2014.11)

(56) References Cited

U.S. PATENT DOCUMENTS

| | | | |
|---|---|---|---|
| 9,473,779 | B2 | 10/2016 | Rapaka et al. |
| 9,591,325 | B2 | 3/2017 | Li et al. |
| 9,628,792 | B2 | 4/2017 | Rapaka et al. |
| 9,807,406 | B2 | 10/2017 | Ramasubramonian et al. |
| 10,057,574 | B2 | 8/2018 | Li et al. |
| 10,200,700 | B2 | 2/2019 | Zhang et al. |
| 10,250,882 | B2 * | 4/2019 | Sullivan ............... H04N 19/186 |
| 10,321,130 | B2 | 6/2019 | Dong et al. |
| 10,404,999 | B2 | 9/2019 | Liu et al. |
| 10,419,757 | B2 | 9/2019 | Chen et al. |
| 10,469,847 | B2 | 11/2019 | Xiu et al. |
| 10,506,230 | B2 | 12/2019 | Zhang et al. |
| 10,531,111 | B2 | 1/2020 | Li et al. |
| 10,708,592 | B2 | 7/2020 | Dong et al. |
| 10,721,469 | B2 | 7/2020 | Zhang et al. |
| 10,728,573 | B2 | 7/2020 | Sun et al. |
| 10,778,974 | B2 | 9/2020 | Karczewicz et al. |
| 10,855,985 | B2 | 12/2020 | Zhang et al. |
| 10,939,128 | B2 | 3/2021 | Zhang et al. |
| 10,965,941 | B2 | 3/2021 | Zhao et al. |
| 10,979,717 | B2 | 4/2021 | Zhang et al. |
| 2004/0008790 | A1 * | 1/2004 | Rodriguez ............. H04N 19/70 375/E7.199 |
| 2005/0168650 | A1 * | 8/2005 | Walls ................ H04N 9/646 348/E9.042 |
| 2013/0094572 | A1 * | 4/2013 | Van der Auwera .. H04N 19/117 375/240.03 |
| 2014/0092999 | A1 * | 4/2014 | Dong ................ H04N 19/70 375/240.29 |
| 2014/0133547 | A1 | 5/2014 | Tanaka |
| 2014/0307774 | A1 * | 10/2014 | Minoo ............... H04N 19/134 375/240.02 |
| 2014/0369426 | A1 * | 12/2014 | Li .................. H04N 19/186 375/240.29 |
| 2015/0215617 | A1 * | 7/2015 | Leontaris ............. H04N 19/147 375/240.03 |
| 2017/0006283 | A1 * | 1/2017 | Zhou ................ H04N 19/117 |
| 2017/0238020 | A1 | 8/2017 | Karczewicz et al. |
| 2017/0244975 | A1 | 8/2017 | Wang et al. |
| 2018/0041778 | A1 | 2/2018 | Zhang et al. |
| 2018/0041779 | A1 | 2/2018 | Zhang et al. |
| 2018/0184127 | A1 | 6/2018 | Zhang et al. |
| 2018/0220138 | A1 | 8/2018 | He et al. |
| 2018/0359480 | A1 | 12/2018 | Xiu et al. |
| 2019/0215532 | A1 | 7/2019 | He et al. |
| 2019/0230353 | A1 | 7/2019 | Gadde et al. |
| 2019/0238845 | A1 | 8/2019 | Zhang et al. |
| 2019/0306502 | A1 | 10/2019 | Gadde et al. |
| 2020/0092574 | A1 | 3/2020 | Li et al. |
| 2020/0120359 | A1 | 4/2020 | Hanhart et al. |
| 2020/0236353 | A1 | 7/2020 | Zhang et al. |
| 2020/0252619 | A1 | 8/2020 | Zhang et al. |
| 2020/0260120 | A1 | 8/2020 | Hanhart et al. |
| 2020/0267381 | A1 | 8/2020 | Vanam et al. |
| 2020/0314418 | A1 | 10/2020 | Wang et al. |
| 2020/0322632 | A1 | 10/2020 | Hanhart et al. |
| 2020/0413038 | A1 | 10/2020 | Zhang et al. |
| 2020/0359051 | A1 | 11/2020 | Zhang et al. |
| 2020/0366910 | A1 | 11/2020 | Zhang et al. |
| 2020/0366933 | A1 | 11/2020 | Zhang et al. |
| 2020/0374540 | A1 | 11/2020 | Wang et al. |
| 2020/0382769 | A1 | 12/2020 | Zhang et al. |
| 2020/0404275 | A1 * | 12/2020 | Hsiang ................ H04N 19/186 |
| 2020/0404309 | A1 * | 12/2020 | Guo .................. H04N 21/2343 |
| 2021/0067793 | A1 | 3/2021 | Hu et al. |
| 2021/0067802 | A1 | 3/2021 | Jin et al. |
| 2021/0076034 | A1 | 3/2021 | Misra et al. |
| 2021/0084295 | A1 | 3/2021 | Chen et al. |
| 2021/0084318 | A1 | 3/2021 | Kuo et al. |
| 2021/0092395 | A1 | 3/2021 | Zhang et al. |
| 2021/0092396 | A1 | 3/2021 | Zhang et al. |
| 2021/0152837 | A1 | 5/2021 | Zhang et al. |
| 2021/0160513 | A1 | 5/2021 | Hu et al. |
| 2021/0185353 | A1 | 6/2021 | Xiu et al. |
| 2021/0211662 | A1 | 7/2021 | Wang et al. |
| 2021/0211681 | A1 | 7/2021 | Zhang et al. |
| 2021/0235109 | A1 | 7/2021 | Liu et al. |
| 2021/0258571 | A1 | 8/2021 | Zhang et al. |
| 2021/0258572 | A1 | 8/2021 | Zhang et al. |
| 2021/0297694 | A1 | 9/2021 | Zhang et al. |
| 2021/0314595 | A1 | 10/2021 | Zhang et al. |
| 2021/0314628 | A1 | 10/2021 | Zhang et al. |
| 2021/0321095 | A1 | 10/2021 | Zhang et al. |
| 2021/0321121 | A1 | 10/2021 | Zhang et al. |
| 2021/0321131 | A1 | 10/2021 | Zhang et al. |
| 2021/0337228 | A1 | 10/2021 | Wang et al. |
| 2021/0337239 | A1 | 10/2021 | Zhang et al. |
| 2021/0344902 | A1 | 11/2021 | Zhang et al. |
| 2021/0368171 | A1 | 11/2021 | Zhang et al. |
| 2021/0377524 | A1 | 12/2021 | Zhang et al. |
| 2021/0385446 | A1 | 12/2021 | Liu et al. |
| 2021/0392381 | A1 | 12/2021 | Wang et al. |
| 2021/0400260 | A1 | 12/2021 | Zhang et al. |
| 2021/0409703 | A1 | 12/2021 | Wang et al. |
| 2022/0007014 | A1 | 1/2022 | Wang et al. |
| 2022/0070500 | A1 | 3/2022 | Li et al. |
| 2022/0182641 | A1 | 6/2022 | Nam et al. |
| 2022/0201294 | A1 | 6/2022 | Nam et al. |
| 2022/0264106 | A1 | 8/2022 | Zhang et al. |
| 2022/0272348 | A1 | 8/2022 | Zhang et al. |

FOREIGN PATENT DOCUMENTS

| | | | |
|---|---|---|---|
| CN | 109691102 A | | 4/2019 |
| TW | 201743619 A | * 11/2014 | |
| TW | 201743619 A | * 12/2017 | ........... H04N 19/107 |
| WO | 2013059461 A1 | | 4/2013 |
| WO | 2015198954 A1 | | 12/2015 |
| WO | 2016057782 A1 | | 4/2016 |
| WO | 2017123487 A1 | | 7/2017 |
| WO | 2018045207 A1 | | 3/2018 |
| WO | 2019194647 A1 | | 10/2019 |
| WO | 2021061814 A1 | | 4/2021 |

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chubach et al. "CE5-related: Simplified CCALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0165, 2019.

Chubach et al. "CE5-Related: Combination of JVET-P0165, P0556, and P0557 on Simplifying CCALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0739, 2019.

(56) References Cited

OTHER PUBLICATIONS

Hu et al. "CE5-Related: Temporal Buffer Removal for Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0556, 2019.
ITU-T H.265 "High efficiency video coding" Series H: Audiovisual and Multimedia SYSTEMSInfrastructure of audiovisual services—Coding of movingvideo, Telecommunicationstandardization Sectorof ITU (Nov. 2019).
Karczewicz et al. "Geometry Transformation-based Adaptive In-Loop Filter," Picture Coding Symposium (PCS), 2016.
Li et al. "AHG16/Non-CE5: Cross Component ALF Simplification," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0173, 2019.
Li et al. "Non-CE5: Simplification of Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0470, 2019.
Lim et al. "CE2: Subsampled Laplacian calculation (Test 6.1, 6.2, 6.3, and 6.4)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0147, 2018.
Misra et al. "Cross-Component Adaptive Loop Filter for Chroma," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0636, 2019.
Misra et al. "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0080, 2019.
Misra et al. "CE5-Related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1008, 2019.
Taquet et al. "CE5: Results of Tests CE5-3.1 to CE5-3.4 on Non-Linear Adaptive Loop Filter," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0242, 2019.
Taquet et al. "Non-CE5 : Parsability of ALF Chroma Filter Alternative Signaling," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0332, 2019.
https://vcgit.hhi.fraunhofer.de/jvet/VVCSoftware_VTM/tags/VTM-6.0.
International Search Report and Written Opinion from International Patent Application No. PCT/CN2020/124700 dated Jan. 8, 2021 (10 pages).
International Search Report and Written Opinion from International Patent Application No. PCT/CN2020/124701 dated Feb. 4, 2021 (10 pages).
International Search Report and Written Opinion from International Patent Application No. PCT/CN2020/124705 dated Feb. 4, 2021 (12 pages).
Non Final Office Action from U.S. Appl. No. 17/732,743 dated Aug. 1, 2022.
Non Final Office Action from U.S. Appl. No. 17/732,777 dated Aug. 5, 2022.
Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE Jul. 3-12, 2019, document JVET-O2001, 2019.
Tsai et al. "Adaptive Loop Filtering for Video Coding," IEEE Journal of Selected Topics in Signal Processing, Dec. 2013, 7(6):934-945.
Yasugi et al. "CE5-Related: Clipping of Intermediate Value in CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0290, 2019.
Yang et al. Specification for U.S. Appl. No. 62/904,335, filed Sep. 23, 2019.
Extended European Search Report from European Patent Application No. 20882345.0 dated Oct. 27, 2022 (12 pages).
Extended European Search Report from European Patent Application No. 20882124.9 dated Oct. 27, 2022 (13 pages).
Extended European Search Report from European Patent Application No. 20881603.3 dated Oct. 27, 2022 (12 pages).
Notice of Allowance from U.S. Appl. No. 17/732,743 dated Nov. 22, 2022.
Notice of Allowance from U.S. Appl. No. 17/732,777 dated Nov. 22, 2022.
Non Final Office Action from U.S. Appl. No. 17/732,743 dated Feb. 8, 2023.

* cited by examiner

Determining that a rule of exclusion is applicable to a conversion between a video region of a video and a bitstream representation of the video, wherein the rule of exclusion specifies that the conversion disallows using a coding tool and a cross-component adaptive loop filtering (CC-ALF) tool together for the video region — 1422

Performing the conversion based on the determining — 1424

FIG. 14B

CROSS-COMPONENT ADAPTIVE LOOP FILTER

CROSS REFERENCE TO RELATED APPLICATIONS

This application is a continuation of International Patent Application No. PCT/CN2020/124700, filed on Oct. 29, 2020, which claims the priority to and benefits of International Patent Application No. PCT/CN2019/113955, filed on Oct. 29, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform cross-component adaptive loop filtering during video encoding or decoding.

In one example aspect, a method of video processing is disclosed. The method includes making a determination for a conversion between a video region of a video and a bitstream representation of the video to use a cross-component adaptive loop filtering (CC-ALF) tool for refining chroma samples values using luma sample values; and performing the conversion based on the determination, wherein the refining includes correcting the chroma sample values using a final refinement that is a further refinement of a first refinement value determined by selectively filtering the luma sample values.

In another example aspect, another method of video processing is disclosed. The method includes making a determination, for a conversion between a video region of a video and a bitstream representation of the video, to use a cross-component adaptive loop filtering (CC-ALF) tool for correcting sample values of a first video block of a first component using sample values of a second video block of a second component; and performing the conversion based on the determination; wherein the CC-ALF tool is used except a case satisfying both 1) that wherein the first component is a Cr or Cb component and 2) the second component is a Y component.

In yet another example aspect, another method of video processing is disclosed. The method includes making a determination, for a conversion between a video unit of a video and a bitstream representation of the video to use a cross-component adaptive loop filtering (CC-ALF) tool for correcting sample values of a first component using sample values of a second component according to a rule; and performing the conversion based on the determination; wherein the rule specifies to use two or more ALF adaptation parameter sets (APSs) that include a first ALF APS and a second ALF APS in the bitstream representation.

In yet another example aspect, another method of video processing is disclosed. The method includes making a determination, fora conversion between a video region of a video aid a bitstream representation of the video to use a cross-component adaptive loop filtering (CC-ALF) tool for correcting sample values of a first component using sample values of a second component according to a rule; and performing the conversion based on the determination; wherein the rule specifies to use two or more CC-ALF filters that include a first CC-ALF filter applied to a first sample in the video region and a second CC-ALF filter applied to a second sample in the video region.

In yet another example aspect, another method of video processing is disclosed. The method includes deriving, fora conversion between a video region of a video and a bitstream representation of the video, a first offset for a first color component of the video region based on luma samples of the video region; deriving a second offset for a second color component of the video region based on the first offset; and performing the conversion by applying a cross-component adaptive loop filtering (CC-ALF) tool to correct the first color component and the second color component based on the luma samples of the video region.

In yet another example aspect, another method of video processing is disclosed. The method includes determining that a cross-component adaptive loop filter (CC-ALF) is used at an M×N sub-block level for a conversion between a video block of a video comprising multiple components and a bitstream representation of the video, M and N are positive integers, with at least one of M and N being greater than 1; and performing the conversion based on the determining, wherein the CC-ALF tool is used for correcting M×N sub-block samples for a first component of the video based on a second component of the video.

In yet another example aspect, another method of video processing is disclosed. The method includes determining, for a conversion between a video region of a video and a bitstream representation of the video, to correct chroma samples of the video region using a cross-component adaptive loop filter (CC-ALF) process based on filtering of luma sample differences; and performing the conversion based on the determining.

In yet another example aspect, another method of video processing is disclosed. The method includes performing a conversion between a portion of a chroma component of a video and a bitstream representation of the video according to a rule, wherein the rule specifies that whether a cross-component adaptive loop filtering (CC-ALF) tool is available for the conversion of the portion of the video is dependent on whether an availability or a use of an adaptive loop filtering (ALF) tool is indicated for a corresponding portion of a luma component.

In yet another example aspect, another method of video processing is disclosed. The method includes performing a conversion between a video region of a video and a bitstream representation of the video, wherein the bitstream representation conforms to a format rule that specifies that whether a syntax element to indicate usage of a cross-component adaptive loop filtering (CC-ALF) tool in the bitstream representation is included depends on a number of available adaptive loop filtering (ALF) adaptation parameter sets (APSs).

In yet another example aspect, another method of video processing is disclosed. The method includes performing a conversion between a video unit of a video and a bitstream representation of the video, wherein the bitstream representation conforms to a format rule that specifies an applicability of a cross-component adaptive loop filtering (CC-ALF) tool to refine sample values of a first component using sample values of a second component is included in the bitstream representation at a video unit level that is different from a slice level.

In yet another example aspect, another method of video processing is disclosed. The method includes performing a conversion between a video region of a video and a bitstream representation of the video, wherein the bitstream representation conforms to a format rule that specifies whether a syntax element to indicate usage of a cross-component adaptive loop filtering (CC-ALF) tool in the bitstream representation depends on an availability of an adaptive loop filtering (ALF) tool used for a corresponding portion of a luma component.

In yet another example aspect, another method of video processing is disclosed. The method includes performing a conversion between a video region of a video and a bitstream representation of the video, wherein the bitstream representation conforms to a format rule specifying that the bitstream representation includes an adaptation parameter set (APS) including a syntax element to indicate whether the APS contains information related to a cross-component adaptive filtering CC-ALF tool.

In yet another example aspect, another method of video processing is disclosed. The method includes determining that a rule of exclusion is applicable to a conversion between a video region of a video and a bitstream representation of the video, wherein the rule of exclusion specifies that the conversion disallows using a coding tool and a cross-component adaptive loop filtering (CC-ALF) tool together for the video region; and performing the conversion based on the determining.

In yet another example aspect, another method of video processing is disclosed. The method includes performing, fora conversion between a chroma block of a video and a bitstream representation of the video according to a rule, wherein a cross-component adaptive loop filter (CC-ALF) tool is used during the conversion for determining a prediction of the chroma block based on samples of a luma block; wherein the rule specifies that the luma block used for the prediction and/or an order in which the CC-ALF tool is used during the conversion.

In yet another example aspect, another method of video processing is disclosed. The method includes determining an order of processing an adaptive loop filter (ALF) of a chroma component and a cross-component adaptive loop filtering (CC-ALF) of the chroma component according to a rule; and performing a conversion between a video and a bitstream representation of the video based on the determining, wherein the rule specifies whether the order is predefined or adaptively changed at a video region of the video, the video region having a size of M×N and M and N being positive integers.

In yet another example aspect, another method of video processing is disclosed. The method includes performing a conversion between a video region of a video and a bitstream representation of the video, wherein the bitstream representation conforms to a format rule that specifies an inclusion of a syntax element in the bitstream representation, the syntax element indicating usage of an adaptive loop filtering (ALF) and a cross-component adaptive loop filtering (CC-ALF) for one chroma component.

In yet another example aspect, a video encoder apparatus is disclosed. The video encoder comprises a processor configured to implement above-described methods.

In yet another example aspect, a video encoder apparatus is disclosed. The video encoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 3A-3D show examples of example of Subsampled Laplacian calculations.

FIGS. 14A to 14C are flowcharts for example methods of video processing based on some implementations of the disclosed technology.

DETAILED DESCRIPTION

Figure 1:
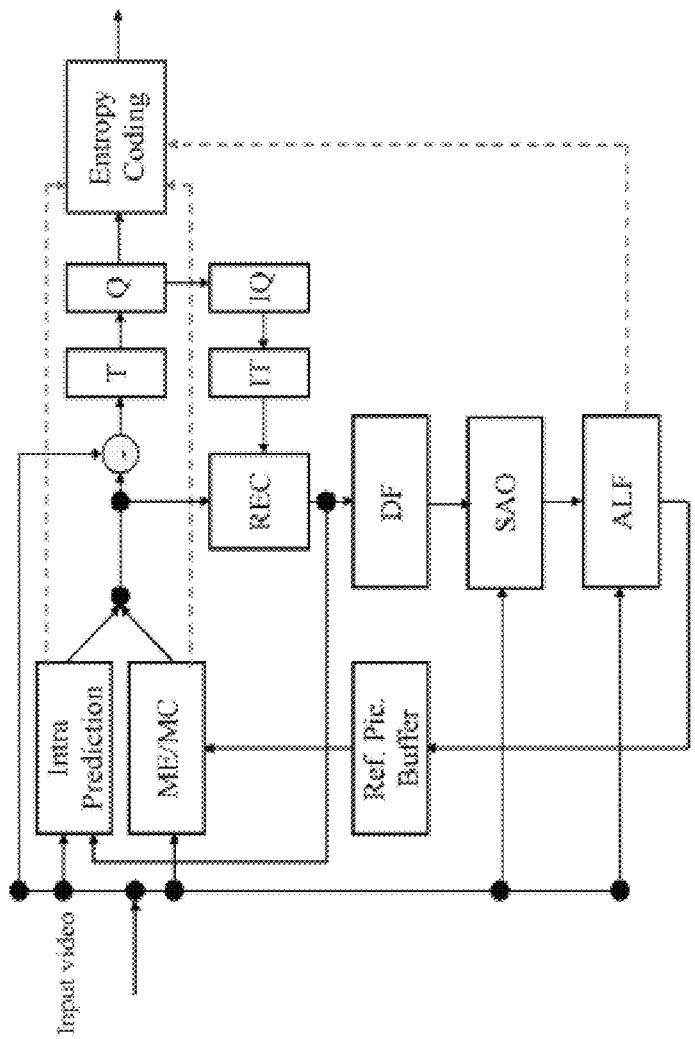
FIG. 1 shows an example of a video encoder.

Section headings are used in the present document for ease of understanding and do not limit the applicability of techniques and embodiments disclosed in each section only to that section. Furthermore, H.266 terminology is used in some description only for ease of understanding aid not for limiting scope of the disclosed techniques. As such, the techniques described herein are applicable to other video codec designs also.

1. Summary

This patent document is related to video coding technologies. Specifically, it is related to cross-component adaptive loop filter in image/video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video aid H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and M PEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the WC standard targeting at 50% bitrate reduction compared to HEVC.

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference 2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.1.4. Coding of Different Color Components

Depending on the value of separate_colour_plane_flag, the value of the variable ChromaArrayType is assigned as follows:
If separate_colour_plane_flag is equal to 0, ChromaArrayType is set equal to chroma_format_idc.
Otherwise (separate_colour_plane_flag is equal to 1), ChromaArrayType is set equal to 0.

2.2. Coding Flow of a Typical Video Codec

FIG. 1 shows an example of encoder block diagram of WC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3. Geometry Transformation-Based Adaptive Loop Filter in JEM

In the JEM, a geometry transformation-based adaptive loop filter (GALF) with block-based filter adaption is applied. For the luma component, one among 25 filters is selected for each 2×2 block, based on the direction and activity of local gradients.

2.3.1. Filter Shape

Figure 2:
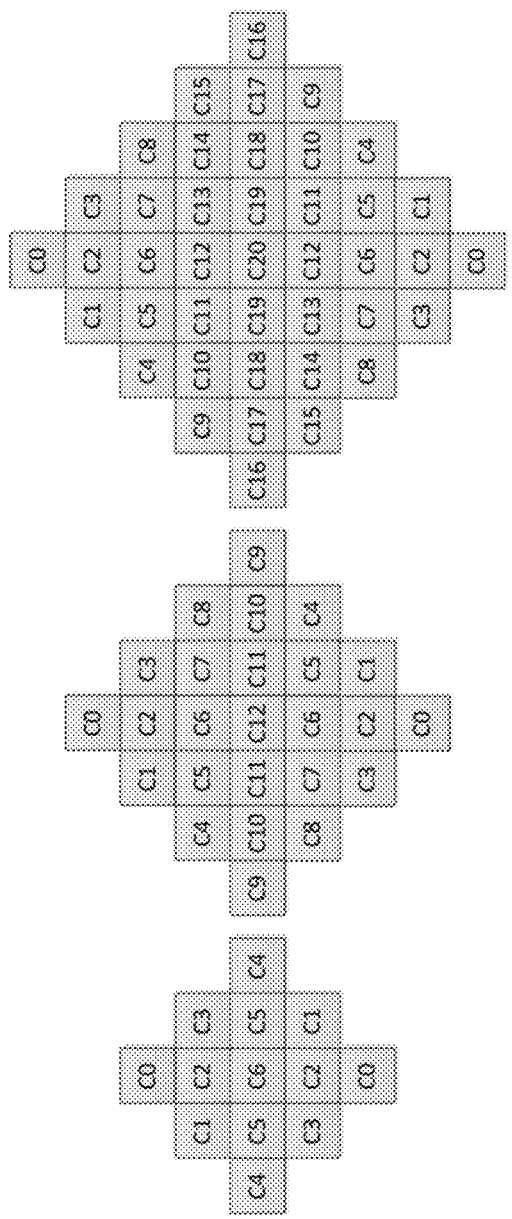
FIG. 2 shows example shapes of geometry transformation based adaptive loop filters.

In the JEM, up to three diamond filter shapes (as shown in FIG. 2) can be selected for the luma component. An index is signalled at the picture level to indicate the filter shape used for the luma component.

FIG. 2 shows examples of GALF filter shapes (left: 5×5 diamond, middle: 7×7 diamond, right: 9×9 diamond)

For chroma components in a picture, the 5×5 diamond shape is always used.

2.3.1.1. Block Classification

Each 2×2 block is categorized into one out of 25 classes. The classification index C is derived based on its directionality D and a quantized value of activity $\hat{A}$, as follows:

$$C = 5D + \hat{A}. \qquad (1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l},\ V_{k,l} = |2R(k,\ l) - R(k,\ l-1) - R(k,\ l+1)|, \qquad (2)$$

$$g_h = \sum_{k=i-2}^{i+3} \sum_{l=j-2}^{j+3} H_{k,l},\ H_{k,l} = |2R(k,\ l) - R(k-1,\ l) - R(k+1,\ l)|, \qquad (3)$$

$$g_{d1} = \sum_{k=i-2}^{i+3} \sum_{l=j-3}^{j+3} D1_{k,l},\ D1_{k,l} = |2R(k,\ l) - R(k-1, l-1) - R(k+1, l+1)| \qquad (4)$$

$$g_{d2} = \sum_{k=i-2}^{i+3} \sum_{j=j-2}^{j+3} D2_{k,l},\ D2_{k,l} = |2R(k,\ l) - R(k-1,\ l+1) - R(k+1,\ l-1)| \qquad (5)$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â.

For both chroma components in a picture, no classification method is applied, i.e. a single set of ALF coefficients is applied for each chroma component.

2.3.1.2. Geometric Transformations of Filter Coefficients

Before filtering each 2×2 block, geometric transformations such as rotation or diagonal and vertical flipping are applied to the filter coefficients f(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k, l) = f(l, k),$ (9)

Vertical flip: $f_V(k, l) = f(k, K - l - 1),$

Rotation: $f_R(k, l) = f(K - l - 1, k).$ where K is the size of the filter and $0 \leq k, l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 1.

TABLE 1

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.3.1.3. Filter Parameters Signalling

In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding anew sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected fora given class, the coefficients of the adaptive filter f(k,l) can still be sent for this class in which case the coefficients of the filter which will be applied to the reconstructed image are sum of both sets of coefficients.

The filtering process of luma component can controlled at CU level. A flag is signalled to indicate whether GALF is applied to the luma component of a CU. For chroma component, whether GALF is applied or not is indicated at picture level only.

2.3.1.4. Filtering Process

At decoder side, when GALF is enabled fora block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i, j) = \sum_{k=-L/2}^{L/2} \sum_{l=-L/2}^{L/2} f(k, l) \times R(i + k, j + l) \quad (10)$$

Alternatively, the filtering process of the Adaptive Loop Filter, could be expressed as follows:

$$O(x, y) = \sum_{(i,j)} w(i, j) \cdot I(x+i, y+j), \quad (11)$$

where samples I(x+i, y+j) are input samples, O(x, y) is the filtered output sample (i.e. filter result), and w(i, j) denotes the filter coefficients. In practice, in VTM4.0, it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \cdot I(x+i, y+j) + 64 \right) \gg 7, \quad (12)$$

where L denotes the filter length, and where w(i, j) are the filter coefficients in fixed point precision.

2.4. Non-Linear ALF
2.4.1. Filtering Reformulation

Equation (11) can be reformulated, without coding efficiency impact, in the following expression:

$$O(x, y) = I(x, y) + \sum_{(i,j)\neq(0,0)} w(i, j) \cdot (I(x+i, y+j) - I(x, y)), \quad (13)$$

where w(i, j) are the same filter coefficients as in equation (11) [excepted w(0, 0) which is equal to 1 in equation (13) while it is equal to $1 - \sum_{(i,j)\neq(0,0)} w(i, j)$ in equation (11)].

2.4.2. Modified Filter

Using this above filter formula of (13), we can easily introduce non linearity to make ALF more efficient by using a simple clipping function to reduce the impact of neighbor sample values (I(x+i, y+j)) when they are too different with the current sample value (I(x, y)) being filtered.

In this proposal, the ALF filter is modified as follows:

$$O'(x, y) = \quad (14)$$
$$I(x, y) + \sum_{(i,j)\neq(0,0)} w(i, j) \cdot K(I(x+i, y+j) - I(x, y), k(i, j)),$$

where K(d, b)=min (b, max(−b, d)) is the clipping function, and k(i, j) are clipping parameters, which depends on the (i, j) filter coefficient. The encoder performs the optimization to find the best k(i, j).

For easy implementation, the filter coefficient w(i, j) is stored and used in integer precision. The above equation could be rewritten as follows:

$$O'(i, j) = I(i, j) + \quad (15)$$
$$\left( \left( \sum_{k\neq 0} \sum_{l\neq 0} w(k, l) \times K(I(i+k, j+l) - I(i, j), c(k, l)) + 64 \right) \gg 7 \right)$$

where w(k, l) denotes the decoded filter coefficients, K(x, y) is the clipping function and c(k, l) denotes the decoded clipping parameters. The variable k and l varies between $$-\frac{L}{2} \text{ and } \frac{L}{2}$$

where L denotes the filter length. The clipping function K(x,y)=min (y,max(−y,x)) which corresponds to the function Clip3 (−y, y, x).

In the JVET-N0242 implementation, the clipping parameters k(i, j) are specified for each ALF filter, one clipping value is signaled per filter coefficient. It means that up to 12 clipping values can be signalled in the bitstream per Luma filter and up to 6 clipping values for the Chrome filter. In order to limit the signaling cost and the encoder complexity, we limit the evaluation of the clipping values to a small set of possible values. In the proposal, we only use 4 fixed values which are the same for INTER and INTRA tile groups.

Because the variance of the local differences is often higher for Luma than for Chrome, we use two different sets for the Luma and Chrome filters. We also include the maximum sample value (here 1024 for 10 bits bit-depth) in each set, so that clipping can be disabled if it is not necessary.

The sets of clipping values used in the JVET-N0242 tests are provided in the Table 2. The 4 values have been selected by roughly equally splitting, in the logarithmic domain, the full range of the sample values (coded on 10 bits) for Luma, and the range from 4 to 1024 for Chroma. More precisely, the Luma table of clipping values have been obtained by the following formula:

$$AlfClip_L = \left\{ \text{round}\left( \left( (M)^{\frac{1}{N}} \right)^{N-n+1} \right) \text{ for } n \in 1..N \right\}, \quad (16)$$

with $M = 2^{10}$ and $N = 4$.

Similarly, the Chroma tables of clipping values is obtained according to the following formula:

$$AlfClip_C = \left\{ \text{round}\left( A \cdot \left( \left(\frac{M}{A}\right)^{\frac{1}{N-1}} \right)^{N-n} \right) \text{ for } n \in 1..N \right\}, \quad (17)$$

with $M = 2^{10}$, $N = 4$ and $A = 4$.

TABLE 2

| Authorized clipping values | |
|---|---|
| | INTRA/INTER slices |
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 2. This encoding scheme is the same as the encoding scheme for the filter index.

2.5. Geometry Transformation-Based Adaptive Loop Filter in VVC

The current design of GALF in WC has the following major changes compared to that in JEM:
1) The adaptive filter shape is removed. Only 7×7 filter shape is allowed for luma component and 5×5 filter shape is allowed for chroma component.
2) ALF filter coefficients are signaled in ALF Adaptation Parameter Set (APS).
3) Non-linear ALF could be applied.
4) For each CTU, one bit flag for each color component is signaled whether ALF is enabled or disabled.

5) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/ 135 degree gradients for each sample within one block. Instead, 1:2 subsampling is utilized.

Figures 3A, 3B, 3C, 3D:
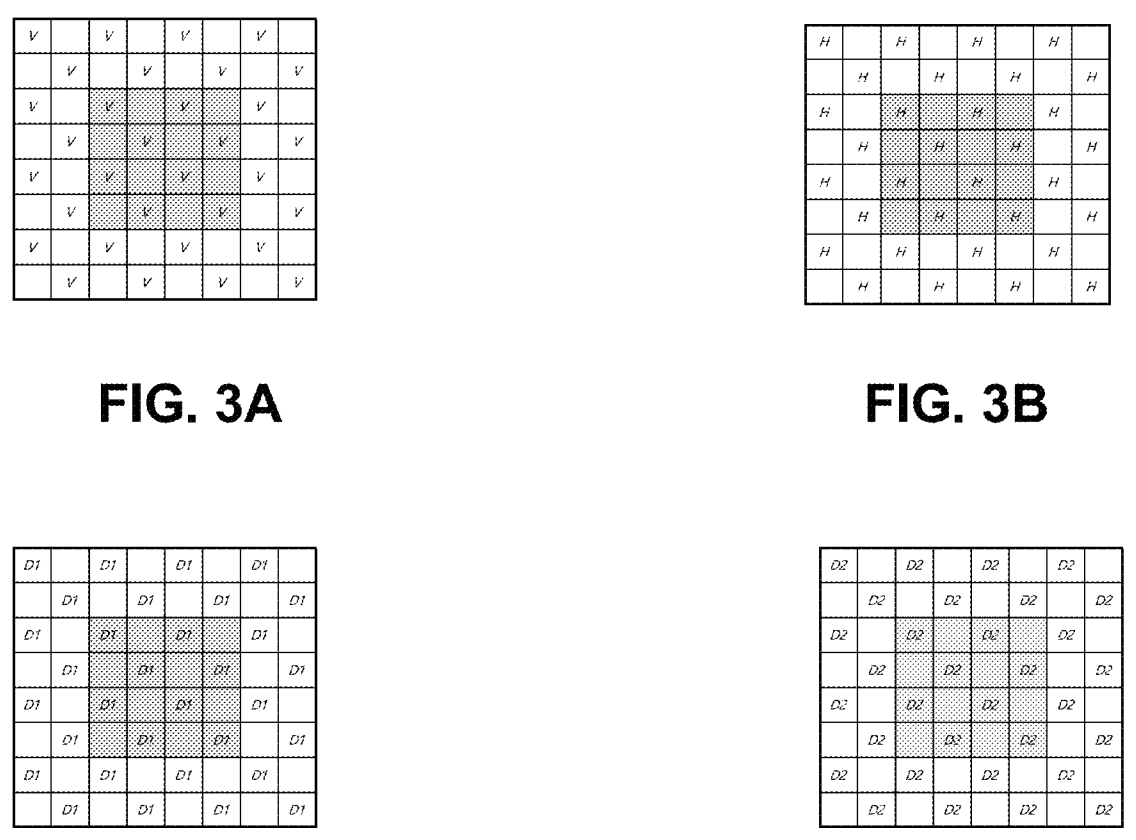

FIG. 3A shows an example of Subsampled Laplacian calculation with subsampled positions for vertical gradient.

FIG. 3B shows an example of Subsampled Laplacian calculation with subsampled positions for horizontal gradient.

FIG. 3C shows an example of Subsampled Laplacian calculation with subsampled positions for diagonal gradient.

FIG. 3D shows an example of Subsampled Laplacian calculation with subsampled positions for diagonal gradient.

2.6. Signaling of ALF Parameters in Adaptation Parameter Set

In the latest version of WC draft, ALF parameters can be signaled in Adaptation Parameter Set (APS) and can be selected by each CTU adaptively. In one APS, up to 25 sets of luma filter coefficients and clipping value indexes, and up to eight sets of chrome filter coefficients and clipping value indexes could be signalled. To reduce bits overhead, filter coefficients of different classification for luma component can be merged. In slice header, the indices of the APSs used for the current slice are signaled.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

The detailed signaling of ALF (in JVET-P2001-v9) is as follows.

7.3.2.5 Adaptation Parameter Set Syntax

|  | Descriptor |
|---|---|
| adaptation_parameter_set_rbsp( ) { |  |
|   adaptation_parameter_set_id | u(5) |
|   aps_params_type | u(3) |
|   if( aps_params_type = = ALF_APS) |  |
|     alf_data( ) |  |
|   else if( aps_params_type = = LMCS_APS) |  |
|     lmcs_data( ) |  |
|   else if( aps_params_type = = SCALING_APS) |  |
|     scaling_list_data( ) |  |
|   aps_extension_flag | u(1) |
|   if( aps_extension_flag) |  |
|     while( more_rbsp_data( ) ) |  |
|       aps_extension_data_flag | u(1) |
|   rbsp_trailing_bits( ) |  |
| } |  |

7.3.2.16 Adaptive Loop Filter Data Syntax

|  | Descriptor |
|---|---|
| alf_data( ) { |  |
|   alf_luma_filter_signal_flag | u(1) |
|   alf_chroma_filter_signal_flag | u(1) |
|   if( alf_luma_filter_signal_flag) { |  |
|     alf_luma_clip_flag | u(1) |
|     alf_luma_num_filters_signalled_minus1 | ue(v) |
|     if( alf_luma_num_filters_signalled_minus1 > 0 ) { |  |
|       for( filtIdx = 0; filtIdx < NumAlfFilters; filtIdx++ ) |  |
|         alf_luma_coeff_delta_idx[ filtIdx ] | u(v) |
|     } |  |
|     alf_luma_coeff_signalled_flag | u(1) |
|     if( alf_luma_coeff_signalled_flag) { |  |
|       for( sfIdx = 0; sfIdx <= alf_luma_num_filters_signalled_minus1 ; sfIdx++ ) |  |
|         alf_luma_coeff_flag[ sfIdx ] | u(1) |
|     } |  |
|     for( sfIdx = 0; sfIdx <= alf_luma_num_filters_signalled_minus1; sfIdx++ ) { |  |
|       if( alf_luma_coeff_flag[ sfIdx ] ) { |  |
|         for(j = 0;j < 12;j++ ) { |  |
|           alf_luma_coeff_abs[ sfIdx ][j ] | uek(v) |
|           if( alf_luma_coeff_abs[ sfIdx ] [j ] ) |  |
|             alf_luma_coeff_sign[ sfIdx ][j ] | u(1) |
|         } |  |
|       } |  |
|     } |  |
|     if( alf_luma_clip_flag ) { |  |
|       for( sfIdx = 0; sfIdx <= alf_luma_num_filters_signalled_minus1; sfIdx++ ) { |  |
|         if( alf_luma_coeff_flag[ sfIdx ] ) { |  |
|           for(j = 0;j < 12;j++) |  |
|             alf_luma_clip_idx[ sfIdx ][j ] | u(2) |
|         } |  |
|       } |  |
|     } |  |
|   } |  |
|   if( alf_chroma_filter_signal_flag) { |  |
|     alf_chroma_num_alt_filters_minus1 | ue(v) |
|     for( a ltId x = 0; a ltIdx <= alf_chroma_num_alt_filters_minus1; altIdx++ ) { |  |
|       alf_chroma_clip_flag[ altIdx ] | u(1) |
|       for( j = 0;j < 6;j++ ) { |  |
|         alf_chroma_coeff_abs[altIdx ] | uek(v) |
|         if( alf_chroma_coeff_abs[ altIdx ][j ]> 0 ) |  |
|           alf_chroma_coeff_sign[ altIdx ][j ] | u(1) |
|       } |  |

| | Descriptor |
|---|---|
| ``if( alf_chroma_clip_flag[ altIdx ] ) {``<br>``   for( j = 0;j < 6; j++)``<br>``      alf_chroma_clip_idx[ altIdx ][j ]``<br>``   }``<br>``  }``<br>`` }``<br>``}`` | u(2) |

7.43.5 Adaptation Parameter Set Semantics

Each APS RBSP shall be available to the decoding process prior to it being referred, included in at least one access unit with TemporalId less than or equal to the TemporalId of the coded slice NAL unit that refers it or provided through external means.

Let as pLayerId be the nuh_layer_id of an APS NAL unit. If the layer with nuh_layer_id equal to aspLayerId is an independent layer (i.e., vps_independent_layer_flag[GeneralLayerIdx[a spLayerId]] is equal to 1), the APS NAL unit containing the APS RB SP shall have nuh_layer_id equal to the nuh_layer_id of a coded slice NAL unit that refens it. Otherwise, the APS NAL unit containing the APS RBSP shall have nuh_layer_id either equal to the nuh_layer_id of a coded slice NAL unit that refers it, or equal to the nuh_layer_id of a direct dependent layer of the layer containing a coded slice NAL unit that refers it.

All APS NAL units with a particular value of adaptation_parameter_set_id and a particular value of aps_pamms_type within an access unit shall have the same content.

adaptation_parameter_set_id provides an identifier for the APS for reference by other syntax elements.

When a ps_pamms_type is equal to ALF_APS or SCALING_APS, the value of adaptation_parameter_set_id shall be in the range of 0 to 7, inclusive.

When a ps_params_type is equal to LMCS_APS, the value of adaptation_parameter_set_id shall be in the ran of 0 to 3, inclusive.

aps_params_type specifies the type of APS parameters carried in the APS as specified in Table 7-2. When aps_pamms_type is equal to 1 (LMCS_APS), the value of adaptation_pammeter_set_id shall be in the range of 0 to 3, inclusive.

TABLE 7-2

APS parameters type codes and types of APS parameters

| aps_params_type | Name of<br>aps_params_type | Type of APS<br>parameters |
|---|---|---|
| 0 | ALF_APS | ALF parameters |
| 1 | LMCS_APS | LMCS parameters |
| 2 | SCALING_APS | Scaling list parameters |
| 3..7 | Reserved | Reserved |

NOTE 1
Each type of APSs uses a separate value space for adaptation_parameter_set_id.
NOTE 2
An APS NAL unit (with a particular value of adaptation_parameter_set_id and a particular value of aps_params_type) can be shared across pictures, and different slices within a picture can refer to different ALF APSs.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

7.4.3.14 Adaptive Loop Filter Data Semantics alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log 2(alf_luma_num_filters_signalled_minus1+1)) bits.

alf_luma_coeff_signalled_flag equal to 1 indicates that alf_luma_coeff_flag[sfIdx] is signalled. alf_luma_coeff_signalled_flag equal to 0 indicates that alf_luma_coeff_flag[sfIdx] is not signalled.

alf_luma_coeff_flag[sfIdx] equal 1 specifies that the coefficients of the luma filter indicated by sfIdx are signalled.

alf_luma_coeff_flag[sfIdx] equal to 0 specifies that all filter coefficients of the luma filter indicated by sfIdx are set equal to 0. When not present, alf_luma_coeff_flag[sfIdx] is set equal to 1.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0.

The order k of the exp-Golomb binarizationuck(v) is set equal to 3.

alf_luma_coeff_sign[sfIdx][j] specifies the sign of the j-th luma coefficient of the filter indicated by sfIdx as follows:
 If alf_luma_coeff_sign[sfIdx][j] is equal to 0, the corresponding luma filter coefficient has a positive value.
  Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signalled_minus1, j=0 . . . 11 is initialized as follows:

filtCoeff[sfIdx][j]=alf_luma_coeff_abs[sfIdx][j]*
(1−2*alf_luma_coeff_sign[sfIdx][j])

The luma filter coefficients AlfCoeff$_L$[adaptation_parameter_set_id] with elements AlfCoeff$_L$[adaptation_parameter_set_id][filtIdx][j], with filtIdx=0 . . . NumAlfFilters−1 and j=0 . . . 11 are derived as follows:

AlfCoeff$_L$[adaptation_parameter_set_id][filtIdx][j]=
filtCoeff[alf_luma_coeff_delta_idx[filtIdx]][j]  (7-48)

The fixed filter coefficients AlfFixFiltCoeff[i][j] with i= 0 . . . 64, j=0 . . . 11 and the class to filter mapping AlfClassToFiltMap[m][n] with m=0 . . . 15 and n=0 . . . 24 are derived as follows:

(7-49)

```
AlfFixFiltCoeff =
{
  { 0, 0, 2, −3, 1, −4, 1, 7, −1, 1, −1, 5}
  { 0, 0, 0, 0, 0, −1, 0, 1, 0, 0, −1, 2}
  { 0, 0, 0, 0, 0, 0, 0, 1, 0, 0, 0, 0}
  { 0, 0, 0, 0, 0, 0, 0, 0, 0, 0, −1, 1}
  { 2, 2, −7, −3, 0, −5, 13, 22, 12, −3, −3, 17}
  {−1, 0, 6, −8, 1, −5, 1, 23, 0, 2, −5, 10}
  { 0, 0, −1, −1, 0, −1, 2, 1, 0, 0, −1, 4}
  { 0, 0, 3, −11, 1, 0, −1, 35, 5, 2, −9, 9}
  { 0, 0, 8, −8, −2, −7, 4, 4, 2, 1, −1, 25}
  { 0, 0, 1, −1, 0, −3, 1, 3, −1, 1, −1, 3}
  { 0, 0, 3, −3, 0, −6, 5, −1, 2, 1, −4, 21}
  {−7, 1, 5, 4, −3, 5, 11, 13, 12, −8, 11, 12}
  {−5, −3, 6, −2, −3, 8, 14, 15, 2, −7, 11, 16}
  { 2, −1, −6, −5, −2, −2, 20, 14, −4, 0, −3, 25}
  { 3, 1, −8, −4, 0, −8, 22, 5, −3, 2, −10, 29}
  { 2, 1, −7, −1, 2, −11, 23, −5, 0, 2, −10, 29}
  {−6, −3, 8, 9, −4, 8, 9, 7, 14, −2, 8, 9}
  { 2, 1, −4, −7, 0, −8, 17, 22, 1, −1, −4, 23}
  { 3, 0, −5, −7, 0, −7, 15, 18, −5, 0, −5, 27}
  { 2, 0, 0, −7, 1, −10, 13, 13, −4, 2, −7, 24}
  { 3, 3, −13, 4, −2, −5, 9, 21, 25, −2, −3, 12}
  {−5, −2, 7, −3, −7, 9, 8, 9, 16, −2, 15, 12}
  { 0, −1, 0, −7, −5, 4, 11, 11, 8, −6, 12, 21}
  { 3, −2, −3, −8, −4, −1, 16, 15, −2, −3, 3, 26}
  { 2, 1, −5, −4, −1, −8, 16, 4, −2, 1, −7, 33}
  { 2, 1, −4, −2, 1, −10, 17, −2, 0, 2, −11, 33}
  { 1, −2, 7, −15, −16, 10, 8, 8, 20, 11, 14, 11}
  { 2, 2, 3, −13, −13, 4, 8, 12, 2, −3, 16, 24}
  { 1, 4, 0, −7, −8, −4, 9, 9, −2, −2, 8, 29}
  { 1, 1, 2, −4, −1, −6, 6, 3, −1, −1, −3, 30}
  {−7, 3, 2, 10, −2, 3, 7, 11, 19, −7, 8, 10}
  { 0, −2, −5, −3, −2, 4, 20, 15, −1, −3, −1, 22}
  { 3, −1, −8, −4, −1, −4, 22, 8, −4, 2, −8, 28}
  { 0, 3, −14, 3, 0, 1, 19, 17, 8, −3, −7, 20}
  { 0, 2, −1, −8, 3, −6, 5, 21, 1, 1, −9, 13}
  {−4, −2, 8, 20, −2, 2, 3, 5, 21, 4, 6, 1}
  { 2, −2, −3, −9, −4, 2, 14, 16, 3, −6, 8, 24}
  { 2, 1, 5, −16, −7, 2, 3, 11, 15, −3, 11, 22}
  { 1, 2, 3, −11, −2, −5, 4, 8, 9, −3, −2, 26}
  { 0, −1, 10, −9, −1, −8, 2, 3, 4, 0, 0, 29}
  { 1, 2, 0, −5, 1, −9, 9, 3, 0, 1, −7, 20}
  {−2, 8, −6, −4, 3, −9, −8, 45, 14, 2, −13, 7}
  { 1, 1, 16, −19, −8, −4, −3, 2, 19, 0, 4, 30}
  { 1, 1, −3, 0, 2, −11, 15, −5, 1, 2, −9, 24}
  { 0, 1, −2, 0, 1, −4, 4, 0, 0, 1, −4, 7}
  { 0, 1, 2, −5, 1, −6, 4, 10, −2, 1, −4, 10}
  { 3, 0, −3, −6, −2, −6, 14, 8, −1, −1, −3, 31}
  { 0, 1, 0, −2, 1, −6, 5, 1, 0, 1, −5, 13}
  { 3, 1, 9, −19, −21, 9, 7, 6, 13, 5, 15, 21}
  { 2, 4, 3, −12, −13, 1, 7, 8, 3, 0, 12, 26}
  { 3, 1, −8, −2, 0, −6, 18, 2, −2, 3, −10, 23}
  { 1, 1, −4, −1, 1, −5, 8, 1, −1, 2, −5, 10}
  { 0, 1, −1, 0, 0, −2, 2, 0, 0, 1, −2, 3}
  { 1, 1, −2, −7, 1, −7, 14, 18, 0, 0, −7, 21}
  { 0, 1, 0, −2, 0, −7, 8, 1, −2, 0, −3, 24}
  { 0, 1, 1, −2, 2, −10, 10, 0, −2, 1, −7, 23}
  { 0, 2, 2, −11, 2, −4, −3, 39, 7, 1, −10, 9}
  { 1, 0, 13, −16, −5, −6, −1, 8, 6, 0, 6, 29}
  { 1, 3, 1, −6, −4, −7, 9, 6, −3, −2, 3, 33}
  { 4, 0, −17, −1, −1, 5, 26, 8, −2, 3, −15, 30}
  { 0, 1, −2, 0, 2, −8, 12, −6, 1, 1, −6, 16}
  { 0, 0, 0, −1, 1, −4, 4, 0, 0, 0, −3, 11}
  { 0, 1, 2, −8, 2, −6, 5, 15, 0, 2, −7, 9}
  { 1, 1, 12, −15, −7, −2, 3, 6, 6, −1, 7, 30}
},
```

-continued $$(7\text{-}50)$$

AlfClassToFiltMap =
{
  { 8, 2, 2, 2, 3, 4, 53, 9, 9, 52, 4, 4, 5, 9, 2, 8, 10, 9, 1, 3, 39, 39, 10, 9, 52 }
  { 11, 12, 13, 14, 15, 30, 11, 17, 18, 19, 16, 20, 20, 4, 53, 21, 22, 23, 14, 25, 26, 26, 27, 28, 10 }
  { 16, 12, 31, 32, 14, 16, 30, 33, 53, 34, 35, 16, 20, 4, 7, 16, 21, 36, 18, 19, 21, 26, 37, 38, 39 }
  { 35, 11, 13, 14, 43, 35, 16, 4, 34, 62, 35, 35, 30, 56, 7, 35, 21, 38, 24, 40, 16, 21, 48, 57, 39 }
  { 11, 31, 32, 43, 44, 16, 4, 17, 34, 45, 30, 20, 20, 7, 5, 21, 22, 46, 40, 47, 26, 48, 63, 58, 10 }
  { 12, 13, 50, 51, 52, 11, 17, 53, 45, 9, 30, 4, 53, 19, o, 22, 23, 25, 43, 44, 37, 27, 28, 10, 55 }
  { 30, 33, 62, 51, 44, 20, 41, 56, 34, 45, 20, 41, 41, 56, 5, 30, 56, 38, 40, 47, 11, 37, 42, 57, 8 }
  { 35, 11, 23, 32, 14, 35, 20, 4, 17, 18, 21, 20, 20, 20, 4, 16, 21, 36, 46, 25, 41, 26, 48, 49, 58 }
  { 12, 31, 59, 59, 3, 33, 33, 59, 59, 52, 4, 33, 17, 59, 55, 22, 36, 59, 59, 60, 22, 36, 59, 25, 55 }
  { 31, 25, 15, 60, 60, 22, 17, 19, 55, 55, 20, 20, 53, 19, 55, 22, 4 6, 25, 43, 60, 37, 28, 10, 55, 52 }
  { 12, 31, 32, 50, 51, 11, 33, 53, 19, 45, 16, 4, 4, 53, 5, 22, 36, 18, 25, 4 3, 2 6, 27, 27, 28, 10 }
  { 5, 2, 44, 52, 3, 4, 53, 4 5, 9, 3, 4, 56, 5, 0, 2, 5, 10, 47, 52, 3, 63, 39, 10, 9, 52 }
  { 12, 34, 44, 44, 3, 56, 56, 62, 45, 9, 56, 56, 7, 5, 0, 22, 38, 40, 47, 52, 4 8, 57, 39, 10, 9 }
  { 35, 11, 23, 14, 51, 35, 20, 41, 56, 62, 16, 20, 41, 56, 7, 16, 21, 38, 24, 40, 26, 26, 42, 57, 39 }
  { 33, 34, 51, 51, 52, 41, 41, 34, 62, o, 41, 41, 5 6, 7, 5, 56, 38, 38, 40, 44, 37, 42, 57, 39, 10 }
  { 16, 31, 32, 15, 60, 30, 4, 17, 19, 25, 22, 20, 4, 53, 19, 21, 22, 46, 25, 55, 26, 48, 63, 58, 55 }
}, It is a requirement of bitstream conformance that the values of $\text{AlfCoeff}_L$[adaptation_pammeter_set_id][filtIdx][j] with filtIdx=0 . . . NumAlfFilters−1, j=0 . . . 11 shall be in the range of $-2^7$ to $2^7-1$, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values $\text{AlfClip}_L$[adaptation_parameter_set_id] with elements $\text{AlfClip}_L$[adaptation_pammeter_set_id][filtIdx][j], with filtIdx=0 . . . NumAlfFilters−1 and j=0 . . . 11 are derived as specified in Table 7-4 depending on bitDepth set equal to $\text{BitDepth}_Y$ and clipIdx set equal to alf_luma_clip_idx[alf_luma_coeff_delta_idx[filtIdx]][j].

alf_chroma_num_alt_filters_minus1 plus 1 specifies the number of alternative filters for chroma components.

alf_chroma_clip_flag[altIdx] equal to 0 specifies that linear adaptive loop filtering is applied on chroma components when using the chroma filter with index altIdx; alf_chroma_clip_flag[altIdx] equal to 1 specifies that non-linear adaptive loop filtering is applied on chroma components when using the chroma filter with index altIdx. When not present, alf_chroma_clip_flag[altIdx] is inferred to be equal to 0.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. It is a requirement of bitstream conformance that the values of alf_chroma_coeff_abs[altIdx][j] shall be in the ran of 0 to $2^7-1$, inclusive.

The order k of the exp-Golomb binarization uek(v) is set equal to 3.

alf_chroma_coeff_sign[altIdx][j] specifies the sign of the j-th chroma filter coefficient for the alternative chroma filter with index altIdx as follows:
  If alf_chroma_coeff_sign[altIdx][j] is equal to 0, the corresponding chroma filter coefficient has a positive value.
  Otherwise (alf_chroma_coeff_sign[altIdx][j] is equal to 1), the corresponding chroma filter coefficient has a negative value.
When alf_chroma_coeff_sign[altIdx][j] is not present, it is inferred to be equal to 0.

The chroma filter coefficients $\text{AlfCoeff}_C$[adaptation_parameter_set_id][altIdx] with elements $\text{AlfCoeff}_C$[adaptation_parameter_set_id][altIdx][j], with altIdx=0 . . . alf_chroma_num_alt_filters_minus1, j=0 . . . 5 are derived a s follows:

$$\text{AlfCoeff}_C[\text{adaptation\_pammeter\_set\_id}][\text{altIdx}][j]= \text{alf\_chroma\_coeff\_abs}[\text{altIdx}][j]*(1-2*\text{alf\_chroma\_coeff\_sign}[\text{altIdx}][j]) \quad (7\text{-}51)$$

It is a requirement of bitstream conformance that the values of $\text{AlfCoeff}_C$[adaptation_pammeter_set_id][altIdx][j] with altIdx=0 . . . alf_chroma_num_alt_filters_minus1, j=0 . . . 5 shall be in the range of $-2^7-1$ to $2^7-1$, inclusive.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values $\text{AlfClip}_C$[adaptation_parameter_set_id][altIdx] with elements $\text{AlfClip}_C$[adaptation_parameter_set_id][altIdx][j], with altIdx=0 . . . alf_chroma_num_alt_filters_minus1, j=0 . . . 5 are derived as specified in Table 7-4 depending on bitDepth set equal to $\text{BitDepth}_C$ and clipIdx set equal to alf_chroma_clip_idx[altIdx][j].

TABLE 7-4

Specification AlfClip depending on bitDepth and clipIdx

| bitDepth | clipIdx | | | |
|---|---|---|---|---|
| | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

2.7. Signaling of ALF Parameters for a CTU

In the VTM6, ALF filter parameters are signalled in Adaptation Parameter Set (APS). In one APS, up to 25 sets of luma filter coefficients and clipping value indexes, and up to 8 sets of chroma filter coefficients and clipping value indexes could be signalled. To reduce bits overhead, filter coefficients of different classification for luma component can be merged. In slice header, the indices of the APSs used for the current slice are signaled.

Clipping value indexes, which are decoded from the APS, allow determining clipping values using a Luma table of clipping values and a Chroma table of clipping values. These clipping values are dependent of the internal bitdepth.

In slice header, up to 7 APS indices can be signaled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

For chroma component, an APS index is signaled in slice header to indicate the chroma filter sets being used for the current slice. At CTB level, a filter index is signaled for each chroma CTB if there is more than one chrome filter set in the APS.

More specifically, the followings apply:

Slice on/off control flags are firstly coded to indicate whether at least one CTU in the slice applies ALF. When it is true, for each CTU, the following are checked and signaled in order:

Related to Luma Part:
1. Whether ALF is applied to the luma CTB. If yes, go to step 2. Otherwise, no further signaling is needed.
2. Check the number of ALF APS used for current slice, denote it by numALFAPS.
3. If numALFAPS is equal to 0, index of fixed filter (e.g., alf_luma_fixed_filter_idx) is signaled. Otherwise, the following apply:

signal a flag to indicate whether it is predicted from the first ALF APS or not.

If not, go to step 4. Otherwise, signaling of ALF parameters for the luma CTB is stopped.

4. If numALFAPS is greater than 1, signal a flag to indicate whether it is predicted from ALF APS or not.

If not, signal the index of fixed filters;

If yes and numALFAPS is greater than 2, signal the index of ALF APS minus 1 with truncated unary.

Related to Chroma Part:
1. Whether ALF is applied to the Cb/Cr CTB. If yes, go to step 2. Otherwise, no further signaling is needed.
2. Signal the index of a filter associated with the i-th ALF APS wherein the APS index is signaled in slice header.

7.3.8.2 Coding Tree Unit Syntax

|  | Descriptor |
|---|---|
| coding_tree_unit( ) { | |
|   xCtb = ( CtbAddrInRs % PicWidthInCtbsY ) < < CtbLog2SizeY | |
|   yCtb = ( CtbAddrInRs / PicWidthInCtbsY ) < < CtbLog2SizeY | |
|   if( slice_sao_luma \|\| flag slice_sao_chroma_flag ) | |
|     sao( xCtb >> CtbLog2SizeY,yCtb >> CtbLog2SizeY ) | |
|   if( slice_alf_enabled_flag ){ | |
|     alf_ctb_flag [ 0 ][ xCtb >> CtbLog2SizeY ][yCtb >> CtbLog2SizeY ] | ae(v) |
|     if( alf_ctb_flag[ 0 ][ xCtb >> CtbLog2SizeY ][yCtb >> CtbLog2SizeY ] ) { | |
|       if( slice_num_alf_aps_ids_luma> 0 ) | |
|         alf_ctb_use_first_aps_flag | ae(v) |
|       if( !alf_ctb_use_first_aps_flag ) { | |
|         if( slice_num_alf_aps_ids_luma > 1 ) | |
|           alf_use_aps_flag | ae(v) |
|         if( alf_use_aps_flag ) { | |
|           if( slice_num_alf_aps_ids_luma > 2 ) | |
|             alf_luma_prev_filter_idx_minus1 | a e(v) |
|         } else | |
|           alf_luma_fixed_filter_idx | ae(v) |
|       } | |
|     } | |
|     if( slice_alf_chroma _idc == 1 \|\| slice_alf_chroma_idc == 3 ) { | |
|       alf_ctb_flag[ 1 ][ xCtb >> CtbLog2SizeY ][yCtb >> CtbLog2SizeY ] | ae(v) |
|       if( alf_ctb_flag[ 1 ][ xCtb >> CtbLog2SizeY ][yCtb >> CtbLog2SizeY ] | |
|         && aps_alf_chroma_num_alt_filters_minus1> 0 ) | |
|         alf_ctb_filter alt_idx[ 0 ][ xCtb >> CtbLog2SizeY ][yCtb >> CtbLog2SizeY ] | ae(v) |
|     } | |
|     if( slice_alf_chroma _idc == 2 \|\| slice_alf_chroma_idc == 3 ) { | |
|       alf_ctb_flag[ 2 ][ xCtb >> CtbLog2SizeY ][yCtb >> CtbLog2SizeY ] | ae(v) |
|       if( alf_ctb_flag[ 2 ][ xCtb >> CtbLog2SizeY ][yCtb >> CtbLog2SizeY ] | |
|         && aps_alf_chroma_num_alt_filters_minus1>0 ) | |
|         alf_ctb_filter alt_idx[ 1 ][ xCtb >> CtbLog2 SizeY ][ yCtb >> CtbLog2SizeY ] | ae(v) |
|     } | |
|   } | |
|   if( slice_type == I && qtbtt_dual_tree_intra_flag ) | |
|     dual_tree_implicit_qt_split (xCtb, yCtb, CtbSizeY, 0 ) | |
|   Else | |
|     coding_tree(xCtb,yCtb, CtbSizeY, CtbSizeY, 1, 1, 0, 0, 0, 0, 0, | |
|           SINGLE_TREE,MODE_TYPE_ALL ) | |
| } | |

2.8. Cross-Component Adaptive Loop Filter (CC-ALF)

Cross-component adaptive loop filter (CC-ALF) uses luma sample values to refine each chroma component. Basically, CC-ALF generates a correction for each of the chroma samples by filtering luma samples, if CC-ALF is applied. It is applied as a loop filter step. The tool is controlled by information in the bit-stream, and this information includes both (a) filter coefficients for each chroma component and (b) a mask controlling the application of the filter for blocks of samples.

Figure 4B:
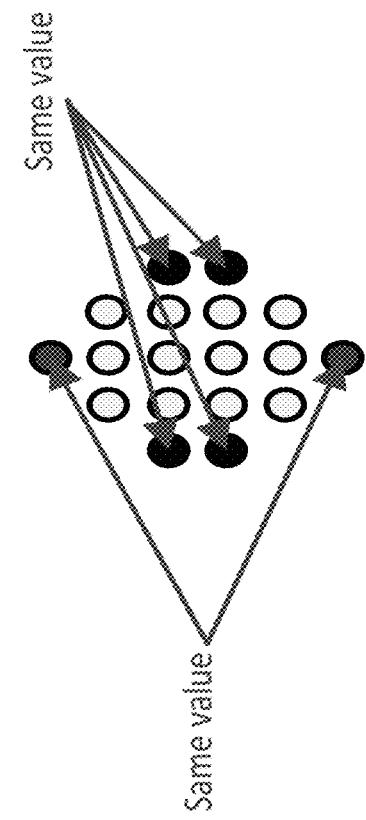
FIGS. 4A and 4B show examples of adaptive loop filter placement and shape.
Figure 4A:
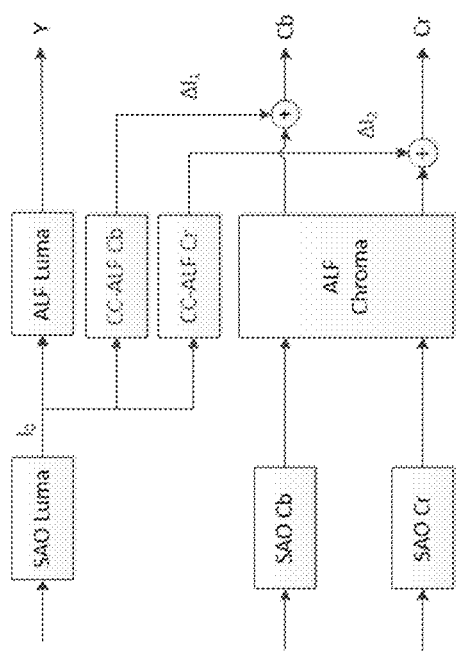

FIG. 4A illustrates the placement of CC-ALF with respect to the other loop filters. CC-ALF operates by applying a linear, diamond shaped filter (as depicted in FIG. 4B) to the luma channel for each chroma component, which is expressed as $$\Delta I_i(x, y) = \sum_{(x_0, y_0) \in S_i} I_0(x_C + x_0, y_C + y_0) c_i(x_0, y_0), \quad (18)$$

wherein
- (x, y) is chroma component i location being refined
- $(x_C, y_C)$ is the luma location based on (x, y)
- $S_i$ is filter support in luma for chroma component i
- $c_i(x_0, y_0)$ represents the filter coefficients FIG. 4A shows placement of CC-ALF with respect to other loop filters. FIG. 4B shows a Diamond shaped filter The CC-ALF process is further described in JVET-O0636. Key features characteristics include:
- The luma location $(x_C, y_C)$, around which the support region is centered, is computed based on the spatial scaling factor between the luma and chroma planes.
- All filter coefficients are transmitted in the APS and have 8-bit dynamic range.
- An APS may be referenced in the slice header.
- CC-ALF coefficients used for each chrome component of a slice are also stored in a buffer corresponding to a temporal sublayer. Reuse of these sets of temporal sublayer filter coefficients is facilitated using slice-level flags.
- The application of the CC-ALF filters is controlled on a variable block size and signalled by a context-coded flag received for each block of samples. The block size along with an CC-ALF enabling flag is received at the slice-level for each chroma component.
- Boundary padding for the horizontal virtual boundaries makes use of repetition. For the remaining boundaries the same type of padding is used as for regular ALF.

2.8.1. Further Simplification of CC-ALF in JVET-P1008

Compared to JVET-P0080, the following new aspects are proposed to simplify the design of CC-ALF.

Figure 5:
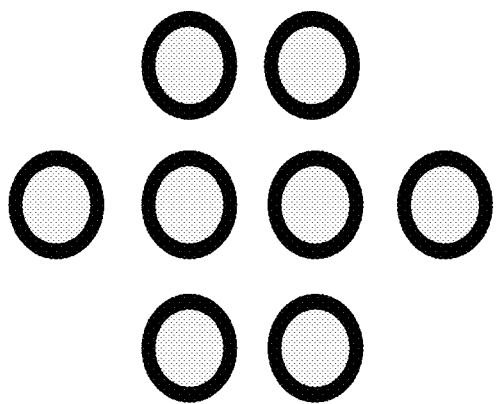
FIG. 5 shows an example of an adaptive loop filter.

Complexity reduction
- Reduce the number of multiplies in the filter operation by changing filter shape to 3×4 diamond shape, as depicted in FIG. 5.
- Limit dynamic range of CC-ALF coefficients to 6-bits
- Allow for sharing of multipliers with chroma ALF Alignment with ALF
- Limit filter selection to signaling at a CTU level
- Removal of the temporal layer coefficient buffers
- Use of symmetric line selection at ALF virtual boundary Additionally, as the simplifications reduce coding efficiency, it is restricted that up to 4 filters per chroma component could be applied.

FIG. 5 shows an example of a 3×4 Diamond shaped filter.

2.8.1.1. Syntax and Semantics of CC-ALF 7.3.6 Slice Header Syntax
7.3.6.1 General Slice Header Syntax

|  | Descriptor |
|---|---|
| slice_header( ) { |  |
|   slice_pic_parameter_set_id | ue(v) |
|   if( rect_slice_flag \|\| NumBricksInPic > 1 ) |  |
|     slice_address | u(v) |
|   if( !rect_slice_flag && !single_brick_per_slice_flag ) |  |
|     num_bricks_in_slice_minus1 | ue(v) |
|   non_reference_picture_flag | u(1) |
|   slice_type | ue(v) |
|   if( separate_colour_plane_flag == 1 ) |  |
|     colour_plane_id | u(2) |
|   slice_pic_order_cnt_lsb | u(v) |
|   if( nal_unit_type == GDR_NUT ) |  |
|     recovery_poc_cnt | ue(v) |
|   if( nal_unit_type == IDR_W_RADL \|\| nal_unit_type == IDR_N_LP \|\| |  |
|     nal_unit_type == CRA_NUT \|\| NalUnitType == GDR_NUT ) |  |
|     no_output_of_prior_pics_flag | u(1) |
|   if( output_flag_present_flag ) |  |
|     pic_output_flag | u(1) |
|   if( ( nal_unit_type != IDR_W_RADL && nal_unit_type != IDR_N_LP ) \|\| |  |
|     sps_idr_rpl_present_flag ) { |  |
|     for( i = 0; i < 2; i++ ) { |  |
|       if( num_ref_pic_lists_in_sps[ i ] > 0 && !pps_ref_pic_list_sps_idc[ i ] && |  |
|         ( i == \|\| 0 ( i == 1 && rpl1_idx_present_flag ) ) ) |  |
|         ref_pic_list_sps_flag[ i ] | u(1) |
|       if( ref_pic_list_sps_flag[ i ] ) { |  |
|         if( num_ref_pic_lists_in_sps[ i ] > 1 && |  |
|           ( i == 0 \|\| (i == 1 && rpl1_idx_present_flag ) ) ) |  |
|         ref_pic_list_idx[ i ] | u(y) |
|       } else |  |
|         ref_pic_list_struct( i, num_ref_pic_lists_in_sps[ i ] ) |  |
|       for(j = 0;j < NumLtrpEntries[ i ][ RplsIdx[ i ] ]; j++ ) { |  |
|         if( ltrp_in_slice_header_flag[ i ][ RplsIdx[ i ] ] ) |  |
|           slice_poc_lsb_lt[ i ] [j ] | u(v) |
|         delta_poc_msb_present_flag[ i ][j ] | u(1) |
|         if( delta_poc_msb_present_flag[ i ][j ] ) |  |

-continued

| | Descriptor |
|---|---|
|         delta_poc_msb_cycle_lt[ i ][j ] | ue(v) |
|       } | |
|     } | |
|     if( ( slice_type != I && num_ref_entries[ 0 ][ RplsIdx[ 0 ] ] > 1 ) \|\| | |
|       ( slice_type == B && num_ref_entries[ 1 ][ RplsIdx[ 1 ] ]> 1 ) ) { | |
|       num_ref_idx_active_override_flag | u(1) |
|       if( num_ref_idx_active_override_flag ) | |
|         for( i = 0; i < ( slice_type == B ? 2: 1); i++ ) | |
|           if( num_ref_entries[ i ][ RplsIdx[ i ] ] > 1 ) | |
|             num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       slice_log2_diff_min_qt_min_cb_luma | ue(v) |
|       slice_max_mtt_hierarchy_depth_luma | ue(v) |
|       if( slice_max_mtt_hierarchy_depth_luma!= 0 ) | |
|         slice_log2_diff_max_bt_min_qt_luma | ue(v) |
|         slice_log2_diff_max_tt_min_qt_luma | ue(v) |
|       } | |
|       if( slice_type == I && qtbtt_dual_tree_intra_flag ) { | |
|         slice_log2_diff_min_qt_min_cb_chroma | ue(v) |
|         slice_max_mtt_hierarchy_depth_chroma | ue(v) |
|         if( slice_max_mtt_hierarchy_depth_chroma != 0 ) | |
|           slice_log2_diff_max_bt_min_qt_chroma | ue(v) |
|           slice_log2_diff_max_tt_min_qt_chroma | ue(v) |
|         } | |
|       } | |
|     } | |
|   } | |
|   if ( slice_type != I ) { | |
|     if( sps_temporal_mvp_enabled_flag && !pps_temporal_mvp_enabled_idc ) | |
|       slice_temporal_mvp_enabled_flag | u(1) |
|     if( slice_type == B && !pps_mvd_l1_zero_idc ) | |
|       mvd_l1_zero_flag | u(1) |
|     if( ca bac_init_present_flag ) | |
|       cabac_init_flag | u(1) |
|     if( slice_temporal_mvp_enabled_flag ) { | |
|       if( slice_type == B && !pps_collocated_from_l0_idc ) | |
|         collocated_from_l0_flag | u(1) |
|       if( ( collocated_from_l0_flag && NumRefIdxActive[ 0 ]> 1 ) \|\| | |
|         ( !collocated_from_l0_flag && NumRefIdxActive[ 1 ] > 1 ) ) | |
|         collocated_ref_idx | ue(v) |
|     } | |
|     if( ( pps_weighted_pred_flag && slice_type == P ) \|\| | |
|       ( pps_weighted_bipred_flag && slice_type == B ) ) | |
|       pred_weight_table( ) | |
|     if( !pps_six_minus_max_num_merge_cand_plus1 ) | |
|       six_minus_max_num_merge_cand | ue(v) |
|     if( sps_affine_enabled_flag && | |
|       !pps_five_minus_max_num_subblock_merge_cand_plus1 ) | |
|       [Ed. (YK): There is a syntax elementname subsetting issue here.] | |
|       five_minus_max_num_subblock_merge_cand | ue(v) |
|     if( sps_fpel_mmvd_enabled_flag ) | |
|       slice_fpel_mmvd_enabled_flag | u(1) |
|     if( sps_bdof_dmvr_slice_present_flag ) | |
|       slice_disable_bdof_dmvr_flag | u(1) |
|     if( sps_triangle_enabled_flag && MaxNumMergeCa >= 2 && | && |
|       !pps_max_num_merge_cand_minus_max_num_triangle_cand_minus1 ) | |
|       [Ed. (YK): There is a syntax elementname subsetting issue here.] | |
|       max_num_merge_cand_minus_max_num_triangle_cand | ue(v) |
|   } | |
|   if ( sps_ibc_enabled_flag ) | |
|     slice_six_minus_max_num_ibc_merge_cand | ue(v) |
|   if( sps_joint_cbcr_enabled_flag ) | |
|     slice_joint_cbcr_sign_flag | u(1) |
|   slice_qp_delta | se(v) |
|   if( pps_ slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( sps_sao_enabled_flag ) { | |
|     slice_sao_luma_flag | u(1) |
|     if( ChromaArrayType != 0 ) | |

| | Descriptor |
|---|---|
|     slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0) | |
|         slice_alf_chroma_idc | u(2) |
|       if( slice_alf_chroma_idc ) | |
|         slice_alf_aps_id_chroma | u(3) |
|     } | |
|     if( ChromaArrayType != 0 ) | |
|       slice_cross_component_alf_cb_enabled_flag | u(1) |
|     if( slice_cross_component_alf_cb_enabled_flag ) { | |
|       slice_cross_component_alf_cb_aps_id | u(3) |
|     } | |
|     if( ChromaArrayType != 0 ) | |
|       slice_cross_component_alf_cr_enabled_flag | u(1) |
|     if( slice_cross_component_alf_cr_enabled_fla g ) { | |
|       slice_cross_component_alf_cr_aps_id | u(3) |
|     } | |
| ... | |
|   } | |
|   byte_alignment( ) | |
| } | |

Adaptive Loop Filter Data Syntax

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     alf_luma_coeff_signalled_flag | u(1) |
|     if( alf_luma_coeff_signalled_flag ) { | |
|       for( sfIdx = 0; sfI dx <= alf_luma_num_filters_signalled_minus1 ; sfIdx++ ) | |
|         alf_luma_coeff_flag[ sfIdx ] | u(1) |
|     } | |
|     for( sfIdx = 0; sfIdx <= alf_luma_num_filters_signalled_minus1 ; sfIdx++ ) { | |
|       if( alf_luma_coeff_flag[ sfIdx ] ) { | |
|         for( j = 0;j < 12; j++ ) { | |
|           alf_luma_coeff_abs[ sfIdx ][j ] | uek(v) |
|           if( alf_luma_coeff_abs[ sfIdx ][j ] ) | |
|             alf_luma_coeff_sign[ sfIdx ][j ] | u(1) |
|         } | |
|       } | |
|     } | |
|     if( alf_luma_clip_flag ) { | |
|       for( sfIdx = 0; sfIdx <= alf_luma_num_filters_signalled_minus1; sfIdx++ ) { | |
|         if( alf_luma_coeff_flag[ sfIdx ] ) { | |
|           for(j = 0;j < 12;j++ ) | |
|             alf_luma_clip_idx[ sfIdx ][j ] | u(2) |
|         } | |
|       } | |
|     } | |
|   } | |
|   if( alf_chroma_filter_signal_flag ) { | |
|     alf_chroma_num_alt_filters_minus1 | ue(v) |
|     for( a ltId x = 0; a ltIdx <= alf_chroma_num_alt_filters_minus1; altIdx++ ) { | |
|       alf_chroma_clip_flag[ a ltIdx ] | u(1) |
|       for( j = 0; j < 6; j++ ) { | |
|         alf_chroma_coeff_abs[ altIdx ][j ] | uek(v) |
|         if( alf_chroma_coeff_abs[ altIdx ][j ] > 0 ) | |

-continued

|  | Descriptor |
|---|---|
|         alf_chroma_coeff_sign[ altIdx ][j ] | u(1) |
|       }<br>      if( alf_chroma_clip_flag[ a ltIdx ] ) {<br>        for(j = 0; j < 6;j++)<br>          alf_chroma_clip_idx[ altIdx ][j ] | u(2) |
|         }<br>      }<br>    }<br>  if ( alf_cross_component_cb_filter_signal_flag ) {<br>    alf_cross_component_cb_filters_signalled_minus1 | ue(v) |
|     for(k = 0; k < (alf_cross_component_cb_filters_signalled_minus1+1); k++ ) {<br>      for(j = 0;j < 8; j++ )<br>        alf_cross_component_cb_coeff_plus32[ k ][j] | u(6) |
|     }<br>  }<br>  if ( alf_cross_component_cr_filter_signal_flag ) {<br>    alf_cross_component_cr_filters_signalled_minus1 | ue(v) |
|     for(k = 0; k < (alf_cross_component_cr_filters_signalled_minus1+1); k++ ) {<br>      for(j = 0;j < 8; j++ )<br>        alf_cross_component_cr_coeff_plus32[ k ][j ] | u(6) |
|     }<br>  }<br>} | |

7.3.8.2 Coding Tree Unit Syntax

|  | Descriptor |
|---|---|
| coding_tree_unit( ) {<br>  xCtb = ( CtbAddrInRs % PicWidthInCtbsY) < < CtbLog2SizeY<br>  yCtb = ( CtbAddrInRs / PicWidthInCtbsY) < < CtbLog2SizeY<br>  if( slice_sao_luma_flag \|\| slice_sao_chroma_flag )<br>    sao(xCtb >> CtbLog2SizeY,yCtb >> CtbLog2SizeY)<br>  if( slice_alf_enabled_flag){<br>    alf_ctb_flag[ 0 ][ xCtb >> CtbLog2SizeY ][yCtb >> CtbLog2SizeY ] | a e(v) |
|     if( alf_ctb_flag[ 0 ][ xCtb >> CtbLog2SizeY ][yCtb >> CtbLog2SizeY ] ) {<br>      if( slice_num_alf_aps_ids_luma > 0 )<br>        alf_ctb_use_first_aps_flag | a e(v) |
|       if( !alf_ctb_use_first_aps_flag ) {<br>        if( slice_num_alf_aps_ids_luma > 1 )<br>          alf_use_aps_flag | a e(v) |
|         if( alf_use_aps_flag ) {<br>          if( slice_num_alf_aps_ids_luma > 2 )<br>            alf_luma_prev_filter_idx_minus1 | a e(v) |
|         } else<br>          alf_luma_fixed_filter_idx | a e(v) |
|         }<br>      }<br>    }<br>  }<br>  if ( slice_cross_component_alf_cb_enabled_flag )<br>    alf_ctb_cross_component_cb_idc[ xCtb >> CtbLog2SizeY ][yCtb >> CtbLog2SizeY ] | a e(v) |
|   if( slice_alf_chroma_idc == 1 \|\| slice_alf_chroma_idc == 3 ) {<br>    alf_ctb_flag[ 1 ][ xCtb >> CtbLog2SizeY ][yCtb >> CtbLog2SizeY ] | a e(v) |
|     if( alf_ctb_flag[ 1 ][ xCtb >> CtbLog2SizeY ][yCtb >> CtbLog2SizeY ]<br>      && aps_alf_chroma_num_alt_filters_minus1 > 0 )<br>      alf_ctb_filter_alt_idx[ 0 ][ xCtb >> CtbLog2SizeY ][yCtb >> CtbLog2SizeY ] | a e(v) |
|   }<br>  if ( slice_cross_component_alf_cr_enabled_flag )<br>    alf_ctb_cross_component_cr_idc[ xCtb >> CtbLog2SizeY ][yCtb >> CtbLog2SizeY ] | a e(v) |
|   if( slice_alf_chroma_idc == 2 \|\| slice_alf_chroma_idc == 3 ) {<br>    alf_ctb_flag[ 2 ][ xCtb >> CtbLog2SizeY ][yCtb >> CtbLog2SizeY ] | a e(v) |
|     if( alf_ctb_flag[ 2 ][ xCtb >> CtbLog2SizeY ][yCtb >> CtbLog2SizeY ]<br>      && aps_alf_chroma_num_alt_filters_minus1 > 0 )<br>      alf_ctb_filter_alt_idx[ 1 ][ xCtb >> CtbLog2SizeY ][yCtb >> CtbLog2SizeY ] | a e(v) |
|   }<br>  if( slice_type = = I && qtbtt_dual_tree_intra_flag )<br>    dual_tree_implicit_qt_split ( xCtb, yCtb, CtbSizeY, 0 )<br>  else<br>    coding)tree( xCtb, yCtb, CtbSizeY, CtbSizeY, 1, 1, 0, 0, 0, 0,0,<br>        SINGLE_TREE,MODE_TYPE_ALL )<br>} | |

3. Technical Problems Solved by Some Disclosed Technical Solutions

The current CC-ALF design has the following problem:
1. Only one CC-ALF mode which utilizes luma information to refine chroma samples is applied which lacks flexibility.
2. The same SPS flag is used to control the usage of non-linear ALF and CC-ALF. It is impossible to turn off CC-ALF separately from non-linear ALF.
3. Signaling of CC-ALF is independent from the non-linear ALF flag (i.e., slice_aif_enabled_flag) which is not reasonable.
4. For each CTB, only one CC-ALF filter (indicated by alf_ctb_cross_component_cb_idc for Cb or alf_ctb_cross_component_cr_idc for Cr) is allowed which couldn't capture the local characteristics.
5. CC-ALF utilizes luma information to refine chroma samples, while other filters, such as SAO, could also refine chroma samples. Repetitive refinements of same chroma sample may result in large distortions.
6. For one CTB, inputs of CC-ALF and chroma ALF filtering process are the same, that is, the reconstruction samples after the SAO process. The interaction between CC-ALF aid chroma ALF filtering process is not taken into consideration.

4. A Listing of Embodiments and Techniques

The list of embodiments below should be considered as examples to explain genera concepts. These items should not be interpreted in a narrow way. Furthermore, these items can be combined in any manner.

In this document, the ALF filter may represent the filter applied to a given color component using the information of the given color component (e.g., Luma ALF filter (liner or non-linear) is applied to luma using luma information; chroma ALF filter is applied to chroma using chroma information, e.g., Cb chrome ALF filter is for filtering Cb samples; and Cr chrome ALF filter is for filtering Cr samples); while the CC-ALF filter may represent a filter applied to a first color component using a second color component information (e.g., the first color component could be Cb or Cr; the second color component could be Luma).

Extension of CC-ALF
1. CC-ALF may be extended to the case that a correction for samples in a first component by filtering samples in a second component which excludes the case that the first is Cb/Cr and second is Y
   a. Alternatively, furthermore, indications of CC-ALF applied to which color component may be signaled.
   b. In one example, the first color component may be Y in the YCbCR format, or G in the RGB format.
   c. In one example, the first color component may be Cb in the YCbCR format, or B in the RGB format.
   d. In one example, the first color component may be Cr in the YCbCR format, or R in the RGB format.
   e. In one example, the second color component may be Y in the YCbCR format, or G in the RGB format.
   f. In one example, the second color component may be Cb in the YCbCR format, or B in the RGB format.
   g. In one example, the second color component may be Cr in the YCbCR format, or R in the RGB format.
2. It is proposed that samples from more than one component may be filtered when deriving the "correction of a sample" or the "refined sample" of a first component in CC-ALF.
   a. In one example, samples from a second component and a third component may be filtered when calculating the correction of a sample from a first component wherein the first component is different from the second and third component.
      i. In one example, the first component is Cb in YCbCr format, and the second and the third component are Y and Cr respectively.
      ii. In one example, the first component is Cr in YCbCr format, and the second and third component are Y and Cb respectively.
      iii. In one example, the first component is Y in YCbCr format, and the second and third component are Cb and Cr respectively.
      iv. In one example, the first component is G in RGB format, and the second and third component are R and B respectively.
      v. In one example, the first component is B in RGB format, and the second and third component are R and G respectively.
      vi. In one example, the first component is R in RGB format, and the second and third component are G and B respectively.
   b. Alternatively, samples from a second component and a third component may be filtered when calculating the correction of a sample from a first component wherein the first component is same with either the second or third component
      i. In one example, the first component is Cb in YCbCr format, and the second and third component are Cb and Y respectively.
      ii. In one example, the first component is Cb in YCbCr format, and the second and the third component are Cb and Cr respectively.
      iii. In one example, the first component is Cr in YCbCr format, and the second and third component are Cr and Y respectively.
      iv. In one example, the first component is Cr in YCbCr format, and the second and third component are Cr and Cb respectively.
      v. In one example, the first component is Y in YCbCr format, and the second and third component are Y and Cb respectively.
      vi. In one example, the first component is Y in YCbCr format, and the second and third component are Y and Cr respectively.
      vii. In one example, the first component is G in RGB format, and the second and third component are G and R respectively.
      viii. In one example, the first component is G in RGB format, and the second and third component are G and B respectively.
      ix. In one example, the first component is B in RGB format, and the second and third component are B and R respectively.
      x. In one example, the first component is B in RGB format, and the second and third component are B and G respectively.
      xi. In one example, the first component is R in RGB format, and the second and third component are R and G respectively.

xii. In one example, the first component is R in RGB format, and the second and third component are R and B respectively.
c. In one example, samples from three components may be filtered when calculating the correction of a sample from a first component.
  i. In one example, the first component is Cb in YCbCr format, or Cr or Y.
  ii. In one example, the first component is G in RGB format, or R or B.
  iii. In one example, the three components are Y, Cb and Cr in YCbCrformat.
  iv. In one example, the three components are R, G and B in RGB format.
d. In one example, indications of the first/second/third component and/or how may components need to be filtered for one offset derivation may be signaled from encoder to decoder or pre-defined.

In the following descriptions, it is assumed that CC-ALF is applied to chroma components (e.g. Cb or Cr). It should be noted that when CC-ALF is extended to refine other color components (such as luma or G, or B, or R), similar ideas could be applied by changing the color component.

Multiple Filters in CC-ALF

3. More than 1 ALF APS may be referred by a video unit (such as a slice/picture) for the CC-ALF process. That is, for at least a first sample in a video unit, the CC-ALF filters in a first ALF APS may be utilized while the CC-ALF filter in a second ALF APS may be utilized for at least a second sample in the video unit.
   a. In one example, the number of referred ALF APSs may be coded.
   b. In one example, the indices of ALF APSs may be coded.
   c. In one example, the same set of ALF APSs that the luma ALF filters refer to may be utilized for the CC-ALF.
      i. Alternatively, furthermore, there is no need to signal the ALF APSs that are used for deriving CC-ALF filters.
   d. In one example, a sub-set or a super-set of ALF APSs that the luma ALF refer to may be utilized for the CC-ALF.
      i. Alternatively, furthermore, the differences of ALF APSs that are used for deriving CC-ALF filters and luma ALF filters may be signaled.

4. More than 1 CC-ALF filter may be utilized fora video region (such as a CTB) for the CC-ALF process. That is, for at least a first sample in a video region, a first CC-ALF filter may be utilized while the CC-ALF filter in a second CC-ALF filter may be utilized for at least a second sample in the video region.
   a. In one example, indications of multiple CC-ALF filters may be signaled in a video area (e.g., CTB/CU/CB/PU/PB, CTB row).
      i. In one example, the indications may include selected CC-ALF filter indices in one ALF APS.
      ii. Alternatively, the indications may include selected CC-ALF filter indices and indices of ALF APSs where the CC-ALF filter is associated with.
      iii. Alternatively, the indications may include selected fixed CC-ALF filters which are not signaled in APS.
         a) Alternatively, furthermore, fixed CC-ALF filters may be pre-defined and utilized for predicting a selected CC-ALF filter/being inherited by a block as a selected CC-ALF filter.
      iv. In one example, the video area is the same as the video region.
      v. Alternatively, the video area may be larger (e.g., a slice) or smaller than (e.g., a CU) the video region.
   b. In one example, chroma samples may be classified to multiple sets and how to select a CC-ALF filter may depend on the classification results.
      i. In one example, two chroma components may derive the classification independently.
         a) In one example, the classification process for a chroma component may be dependent on the chrome sample information for a chroma component.
      ii. In one example, two chroma components may derive the classification jointly.
         a) In one example, the classification process for two corresponding chroma blocks (Cb and Cr) may be dependent on chroma samples within the two blocks.
      iii. In one example, the classification process for a chroma component may depend on the information of the luma color component.
         a) In one example, the same class index may be set to a chroma block and its corresponding luma block.
      iv. In one example, the classification process for one or multiple chroma components may depend on a joint decision based on more than one component. (such as Y+Cb+Cr or Y+Cb, or Y+Cr)
      v. In one example, chroma samples may be classified to multiple sets following the corresponding classification of luma samples in luma ALF.
      vi. Alternatively, furthermore, indications on how to select an CC-ALF filter according to a classification index may be further signaled, such as CC-ALF filter index for each classification index may be signaled.

Revised Filtering Process of CC-ALF

5. It is proposed to modify the refinement (e.g., the derived offset) before it is being used to refine a chroma sample.
   a. In one example, the derived offset may be clipped to a given range.
      i. In one example, whether to and/or how to clip the offset may be signaled from the encoder to the decoder.

6. Instead of performing the CC-ALF filtering process twice for two corresponding chroma samples of a pixel, it is proposed to invoke it once. Suppose Offset1 for pixel S of a first color component may be derived from luma samples, Offset2 for pixel S of a second color component may be derived from Offset1.
   a. In one example, Offset1 is equal to Offset2.
   b. In one example, the Offset1 plus Offset2 may be equal to 0.
   c. In one example, Offset2 may be derived as a linear function of Offset1, e.g. Offset2 is equal to a*Offset1+b.
   d. In one example, Clipping operation may be used to derive Offset2 from Offset1.
   e. In one example, the Offset2 may be derived based on the offset 1 and the slice-level sign flag of the joint Cb and Cr mode (e.g. slice_joint_cbcr_sign_flag).
      i. In one example, the offset2 may be set equal to offset1 when slice_joint_cbcr_sign_flag is 0.

a) Alternatively, in one example, the offset2 may be set equal to −offset1 when slice_joint_cbcr_sign_flag is 1.
f. In one example, one set of CC-ALF filters may be used for two corresponding chroma samples (e.g., Cb and Cr).
  i. Alternatively, furthermore, for the two chrome components, indications of CC-ALF filters may be only signaled once instead of twice.
g. Alternatively, furthermore, a correction of an offset for a chroma component may be further signaled or derived.
  i. In one example, the offset (denoted by O) derived from luma samples may be directly used to refine one sample of a first chroma component (e.g., Cb), the O and a correction of O may be both used to refine one sample of a second chroma component (e.g., Cr).
7. Instead of performing the CC-ALF filtering process at sample-level, it is proposed to apply it at a sub-block (containing more than 1 sample) level.
  a. In one example, for all chroma samples within a sub-block, the offset derivation process may be invoked only once.
  b. In one example, for chroma samples within a sub-block, the same offset may be utilized.
    i. Alternatively, the offset derived from at least from a second color component may be further modified, e.g., the offset derived from at least from a second color component may be set as an internal offset, and the final offset for a sample in the sub-block may be derived from the internal offset.
  c. In one example, the sub-block dimensions may be set to M×N (e.g., 2×2; 2×1, 1×2).
  d. In one example, the sub-block dimensions may be dependent on the color format (such as 4:4:4 or 4:2:0).
  e. In one example, the sub-block dimensions may be different in different blocks (such as CTBs).
  f. In one example, the sub-block dimensions may be different for different color components.
  g. In one example, the CC-ALF filter support region may depend on the sub-block dimensions.
  h. In one example, the sub-block size and/or the granularity of CC-ALF invoke may be signaled in a video unit.
8. CC-ALF filtering process is invoked to apply filtering with coefficients on luma sample differences instead of directly on luma samples.
  a. In one example, a luma sample difference may be defined as the difference between one luma sample in the filter support (region) and the corresponding luma sample. Suppose the chroma sample coordinate is denoted by (x, y).
    i. In one example, the corresponding luma sample is the one located at (x, y) for the 4:4:4 format.
    ii. In one example, the corresponding luma sample is the luma samples located at (2x, 2y) for non-4:4:4 format.
    iii. In one example, the corresponding luma sample is derived as a function (e.g., average) of two samples located at (2x, 2y) and (2x, 2y+1) for the 4:2:0 format.
    iv. In one example, the filtering process in equation (18) may be rewritten as:

$$\Delta I_i(x, y) = I_0(\text{corresponding}) + \sum_{(x_0, y_0) \in S_i} (I_0(x_C + x_0, y_C + y_0) - I_0(\text{corresponding})) * c_i(x_0, y_0), \quad (19)$$

wherein
      (x, y) is chroma component i location being refined
      ($x_C$, $y_C$) is the luma location based on (x, y)
      $S_i$ is filter support in luma for chroma component i
      $c_i(x_0, y_0)$ represents the filter coefficients
      Note that if the corresponding sample is defined as ($x_C$, $y_C$), then x0 and y0 both equal to zero is exclude from $S_i$.
  b. Alternatively, furthermore, the luma sample differences may be further modified before being used, such as being clipped.
    i. In one example, the filtering process in equation (18) may be rewritten as:

$$\Delta I_i(x, y) = I_0(\text{corresponding}) + \sum_{(x_0, y_0) \in S_i} \text{Clip}(I_0(x_C + x_0, y_C + y_0) - I_0(\text{corresponding})) * c_i(x_0, y_0), \quad (20)$$

wherein
      (x, y) is chroma component i location being refined
      ($x_C$, $y_C$) is the luma location based on (x, y)
      $S_i$ is filter support in luma for chroma component i
      $c_i(x_0, y_0)$ represents the filter coefficients
      Note that if the corresponding sample is defined as ($x_C$, $y_C$), then x0 and y0 both equal to zero is exclude from $S_i$ and the function Clip may depend on the (x0, y0).
    ii. In one example, whether to and/or how to do the clipping may be signaled.
    iii. In one example, the clipping parameters may be signaled to the decoder.
      a) Alternatively, furthermore, signaling method of the clipping parameters in the luma ALF process may be utilized to signal the clipping parameters in the CC-ALF.
    iv. In one example, the clipping parameters used in the luma ALF process (if available) may be reused in the CC-ALF.

Signalling of CC-ALF
9. In one example, at least one syntax element is signaled in an APS to indicate whether the APS contains information related to CC-ALF.
  a. In one example, an APS containing information related to CC-ALF may be marked as a new APS type.
  b. The indications of signaling Cb and Cr CC-ALF filters (e.g., alf_cross_component_cb_filter_signal_flag and alf_cross_component_cr_filter_signal_flag) may be jointly coded with one syntax element (e.g., denoted by alf_cross_component_filter_signal_flag).
    i. Alternatively, the syntax element may be non-binary value.

10. CC-ALF and a coding tool X may be exclusively used. That is, if CC-ALF is used, then X is disabled or vice versa.
   a. In one example, the coding tool X may be:
      i. SAO for a chroma component
      ii. Chroma residual scaling in LMCS
      iii. Deblocking on chroma component(s).
      iv. ALF on chroma component(s).
   b. In one example, the signaling of CC-ALF related side information may be under the condition check of enabling/disabling the coding tool X.
   c. In one example, the signaling of the coding tool X related side information may be under the condition check of enabling/disabling CC-ALF.
   d. In one example, if a coding tool (either CC-ALF or X) is disabled, the corresponding side information is not signalled.
   e. The determination of whether CC-ALF and a coding tool X are exclusively used may be done for the whole sequence, or for a whole picture, or for a whole slice, or for a region such as a tile, a sub-picture, a CTB, a coding block, etc.
11. Enabling/disabling CC-ALF for a video region (such as a CTB) or video unit (such as a sequence or a picture or a slice) may depend on the signaling and/or usage of ALF for the luma component.
   a. In one example, if ALF parameters are not signaled for the luma component, CC-ALF is forced to be disabled.
      i. Alternatively, furthermore, signaling of CC-ALF related side information may be under the condition check of usage of ALF for the luma component (e.g., alf_luma_filter_signal_flag)
      ii. Alternatively, furthermore, signaling of CC-ALF related side information may be skipped if ALF parameters are not signaled.
   b. In one example, if ALF is disabled for the luma component, CC-ALF is forced to be disabled.
      i. Alternatively, furthermore, signaling of CC-ALF related side information (e.g., slice_cross_component_alf_cb_enabled_flag, slice_cross_component_alf_cr_enabled_flag, alf_ctb_cross_component_cb_idc or alf_ctb_cross_component_cr_idc) may be under the condition check of usage of ALF for the luma component (e.g., slice_atenabled_flag or alf_ctb_flag).
      ii. Alternatively, furthermore, signaling of CC-ALF related side information may be skipped.
12. Whether to signal the usage of CC-ALF may depend on the number of available ALF APSs.
   a. In one example, the signaling of CC-ALF related information (e.g., slice_cross_component_alf_cb_enabled_flag, slice_cross_component_alf_cr_enabled_flag) is under the condition check that the number of available ALF APSs is unequal to 0. Alternatively, the signaling of CC-ALF related information is under the condition check that the number of available ALF APSs is greater to 0.
   b. In one example, if the number of available ALF APSs is equal to 0, the signaling of CC-ALF related information (e.g., slice_cross_component_alf_cb_enabled_flag, slice_cross_component_alf_cr_enabled_flag) may be skipped.
   c. Alternatively, a conformance bitstream shall satisfy that the signaled APS index for CC-ALF and/or ALF shall be no smaller than the number of transmitted ALF APSs.
   d. Alternatively, a conformance bitstream shall satisfy that the signaled APS index for CC-ALF and/or ALF shall refer to one available ALF APS.
   e. Alternatively, whether to signal the usage of CC-ALF may depend on the number of available ALF APSs containing CC-ALF information.

Invoking of CC-ALF

Figure 6:
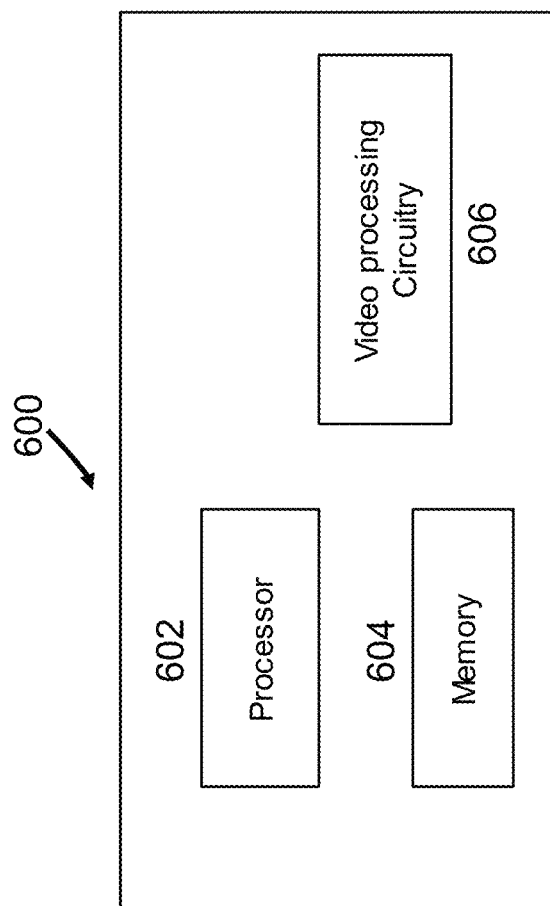
FIGS. 6 and 7 are block diagrams of examples of a hardware platform for implementing a video decoder or video encoder apparatus described herein.

13. CC-ALF may be applied in the prediction stage of a block.
   a. In one example, at encoder side, the prediction error may be generated based on the original block and CC-ALF filtered results, e.g., differences between original signal and CC-ALF filtered results.
   b. In one example, at encoder side, the prediction error may be generated based on the original block, prediction blocks according to a given prediction mode, CC-ALF filtered results, e.g., being set to original signal minus the prediction signal minus CC-ALF filtered results.
   c. In one example, at decoder side, the reconstruction of a block may be dependent on the CC-ALF filtered results and residuals.
   d. In one example, at decoder side, the reconstruction of a block may be dependent on the CC-ALF filtered results, residuals and prediction blocks generated from intra/inter/other coding modes.
   e. In one example, the above examples may be enabled for partial samples within a block but disabled for remaining samples.
      i. In one example, partial samples may denote the samples at the first N rows/column.
      ii. In one example, partial samples may denote the samples at the last N rows/columns.
      iii. In one example, N may depend on the filter shape used in the CC-ALF.
14. CC-ALF may be applied after reconstruction of one block (such as a CTB), before decoding another block.
15. Different orders of filtering methods may be applied instead of applying CC-ALF between SAO and ALF.
   a. In one example, CC-ALF may be applied before all in-loop filters
   b. In one example, CC-ALF may be applied after the reconstruction of a block aid the filtered reconstruction block may be utilized for predicting the proceeding blocks.
   c. In one example, CC-ALF may be applied before SAO.
16. Whether to enable or disable CC-ALF may be signaled in a video unit (e.g., sequence/picture/view/subpicture/tile) other than a slice.
   a. In one example, indication of usage of CC-ALF may be conditionally signaled according to the enabling of ALF.
   b. In one example, indication of usage of CC-ALF may be conditionally signaled according to the chroma color format and/or separate plane coding enabling flag.
   c. In one example, indication of usage of CC-ALF in slice/CTB/CTU may be under the condition check of CC-ALF is enabled for the video unit.
   d. In one example, a syntax element (e.g., a flag) may be signaled in SPS/VPS/PPS/picture header/slice header to indicate whether CC-ALF is allowed to be enabled.

i. Alternatively, furthermore, the syntax element may be coded only when ALF is enabled for the video unit (e.g., only when sps_alf_enabled_flag is equal to 1).
ii. Alternatively, furthermore, the syntax element may be coded only when ALF is enabled for the video unit and ChromaArrayType is unequal to 0 (e.g., only when sps_alf_enabled_flag is equal to 1 and ChromaArrayType is not zero).
17. Indication of usage of CC-ALF may be conditionally signaled according to the enabling of the ALF for luma component.
    a. In one example, if ALF is disabled for luma component, CC-ALF is disabled as well without being explicitly signaled.
18. The order of processing ALF of a chroma component and CC-ALF of the chroma component may be pre-defined or adaptively changed on a M×N region.
    a. In one example, the filtered samples due to chroma ALF filtering process on a M×N region may be further modified before being input to the CC-ALF of the chroma component on the M×N region.
    b. In one example, the filtered samples due to chroma ALF filtering process and/or CC-ALF for a first M×N region may be utilized as inputs to a second M×N region.
    c. In one example, CC-ALF of a chroma component on a M×N region may be done first, followed by ALF of the chroma component on the M×N region.
        i. In one example, for one M×N region, the inputs of chroma ALF filtering process may be the output of CC-ALF.
        ii. In one example, the samples in the M×N region may have been modified by the CC-ALF before been input to the ALF of the chroma component on the M×N region.
    d. In one example, the M×N region may be a CTB.
    e. In one example, the M×N region may be smaller than a CTB.
        i. In one example, the M×N region may be one sample.
    f. The order may be signaled from the encoder to the decoder such as in VPS/DPS/SPS/PPS/picture header/slice header.
19. A syntax element may be signaled to indicate the usage of ALF and CC-ALF for a given chroma component (e.g., Cb or Cr).
    a. In one example, the value of the syntax element may be non-binary.
        i. In one example, the value of the syntax equal to K indicates both non-linear ALF and CC-ALF are disabled for the given color component.
        ii. In one example, the value of the syntax equal to L indicates both non-linear ALF and CC-ALF are enabled for the given color component
        iii. In one example, the value of the syntax equal to M indicates only non-linear ALF is enabled while CC-ALF is disabled for the given color component.
        iv. In one example, the value of the syntax equal to N indicates only CC-ALF is enabled while non-linear ALF is disabled for the given color component.
        v. In above example, K, L, M, N are four integer values, such as K=0, L=3, M=1 and N=2.
    b. The value of the syntax element may be coded with the binarization methods of fixed-length, unary, truncated unary, k-th order EG etc. al.
20. Whether and/or how apply the above methods may be based on one or more conditions listed below:
    a. Video contents (e.g. screen contents or natural contents)
    b. A message signaled in the DPS/SPS/VPS/PPS/APS/picture header/slice header/tile group header/Largest coding unit (LCU)/Coding unit (CU)/LCU row/group of LCUs/TU/PU block/Video coding unit
    c. Position of CU/PU/TU/block/Video coding unit
    d. Decoded information of current block and/or its neighboring blocks
        i. Block dimension/Block shape of current block and/or its neighboring blocks
    e. Indication of the color format (such as 4:2:0, 4:4:4, RGB or YUV)
    f. Coding tree structure (such as dual tree or single tree)
    g. Slice/tile group type and/or picture type
    h. Color component (e.g. may be only applied on luma component and/or chroma component)
    i. Temporal layer ID
    j. Profiles/Levels/Tiers of a standard FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing circuitry 606. The processor(s) 602 may be configured to implement one or more methods described in the present document. The memory (memories) 604 may be used for storing data and code used for implementing the methods and techniques described herein. The video processing circuitry 606 may be used to implement, in hardware circuitry, some techniques described in the present document. In some embodiments, the hardware circuitry 606 may be partly or completely within the processors 602, e.g., a graphics processor.

Figure 7:
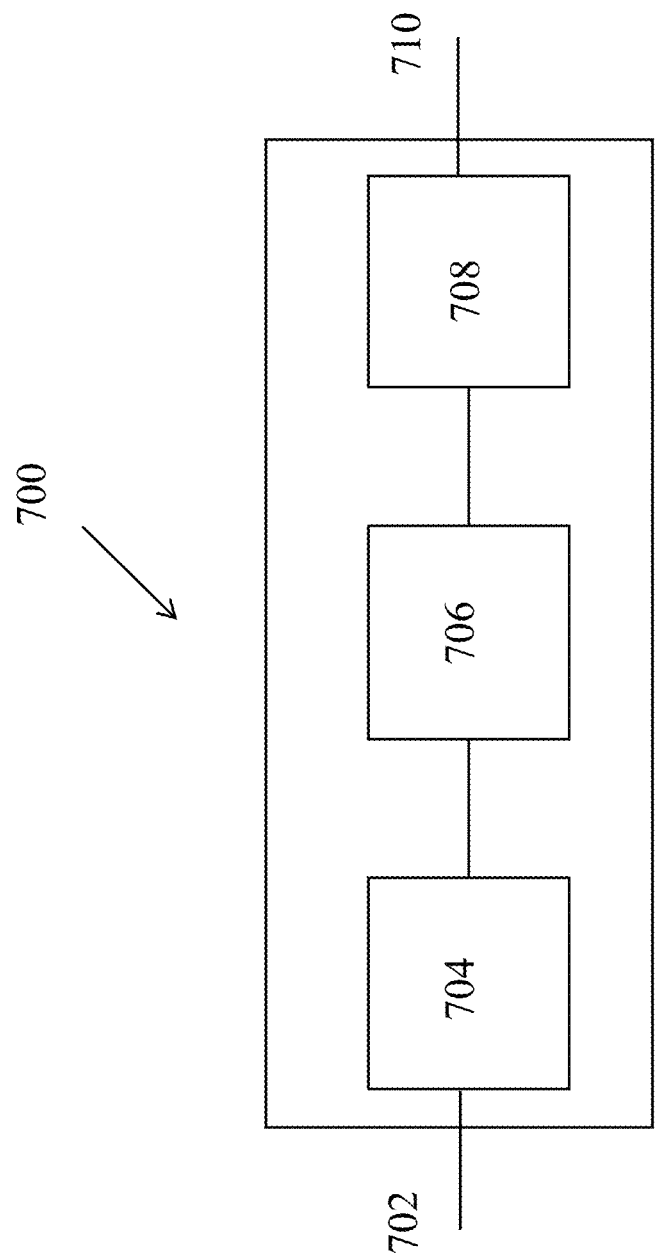

FIG. 7 is a block diagram showing an example video processing system 700 in which various techniques disclosed herein may be implemented. Various implementations may include some or all of the components of the system 700. The system 700 may include input 1902 for receiving video content. The video content may be received in a raw or uncompressed format, e.g., 8 or 10 bit multi-component pixel values, or may be in a compressed or encoded format. The input 702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 700 may include a coding component 704 that may implement the various coding or encoding methods described in the present document. The coding component 704 may reduce the average bitrate of video from the input 702 to the output of the coding component 704 to produce a coded representation of the video. The coding techniques are therefore sometimes called video compression or video transcoding techniques. The output of the coding component 704 may be either stored, or transmitted via a communication connected, as represented by the component 706. The stored or communicated bitstream (or coded) representation of the video received at the input 702 may be used by the component 708 for generating pixel values or displayable video that is sent to a display interface 710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal send bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 8:
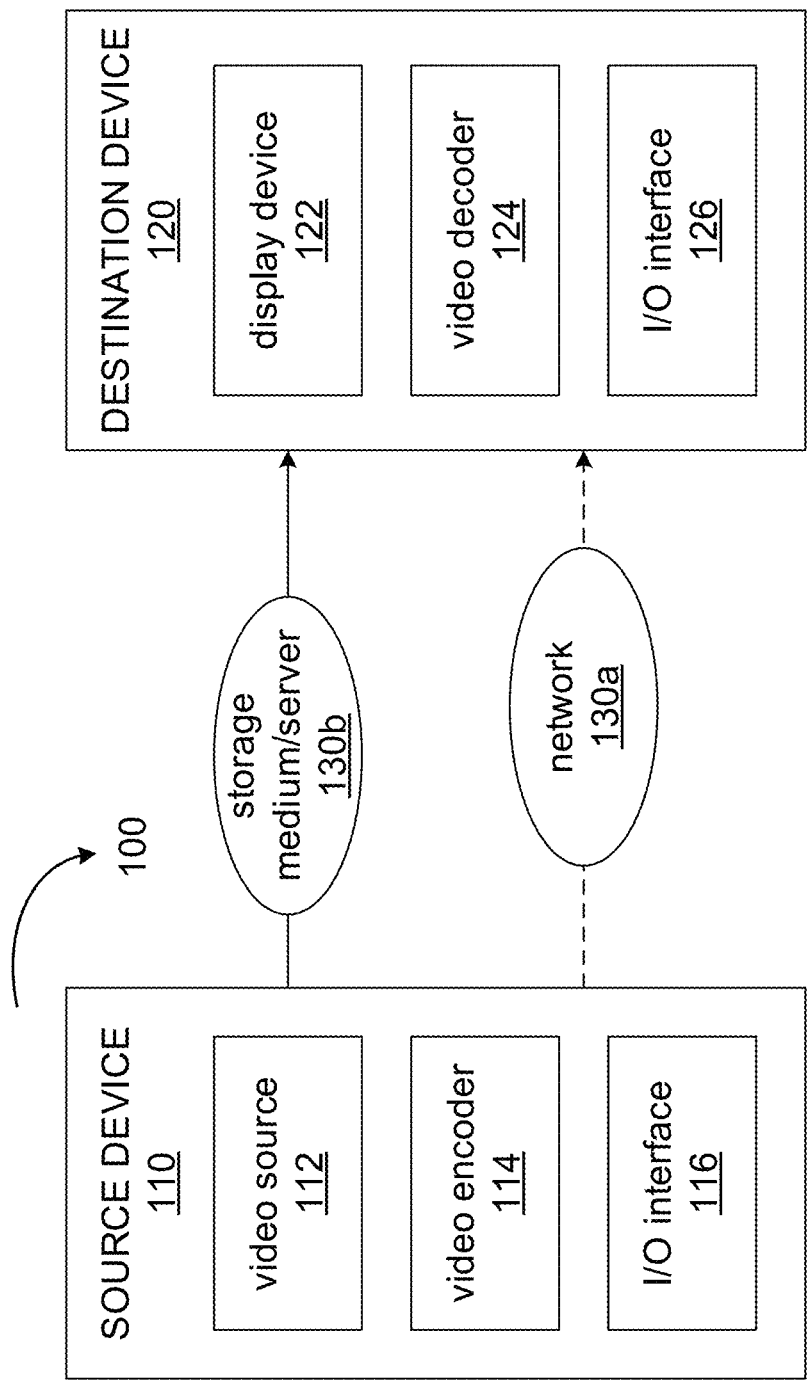
FIG. 8 is a block diagram that illustrates an example video coding system.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 9:
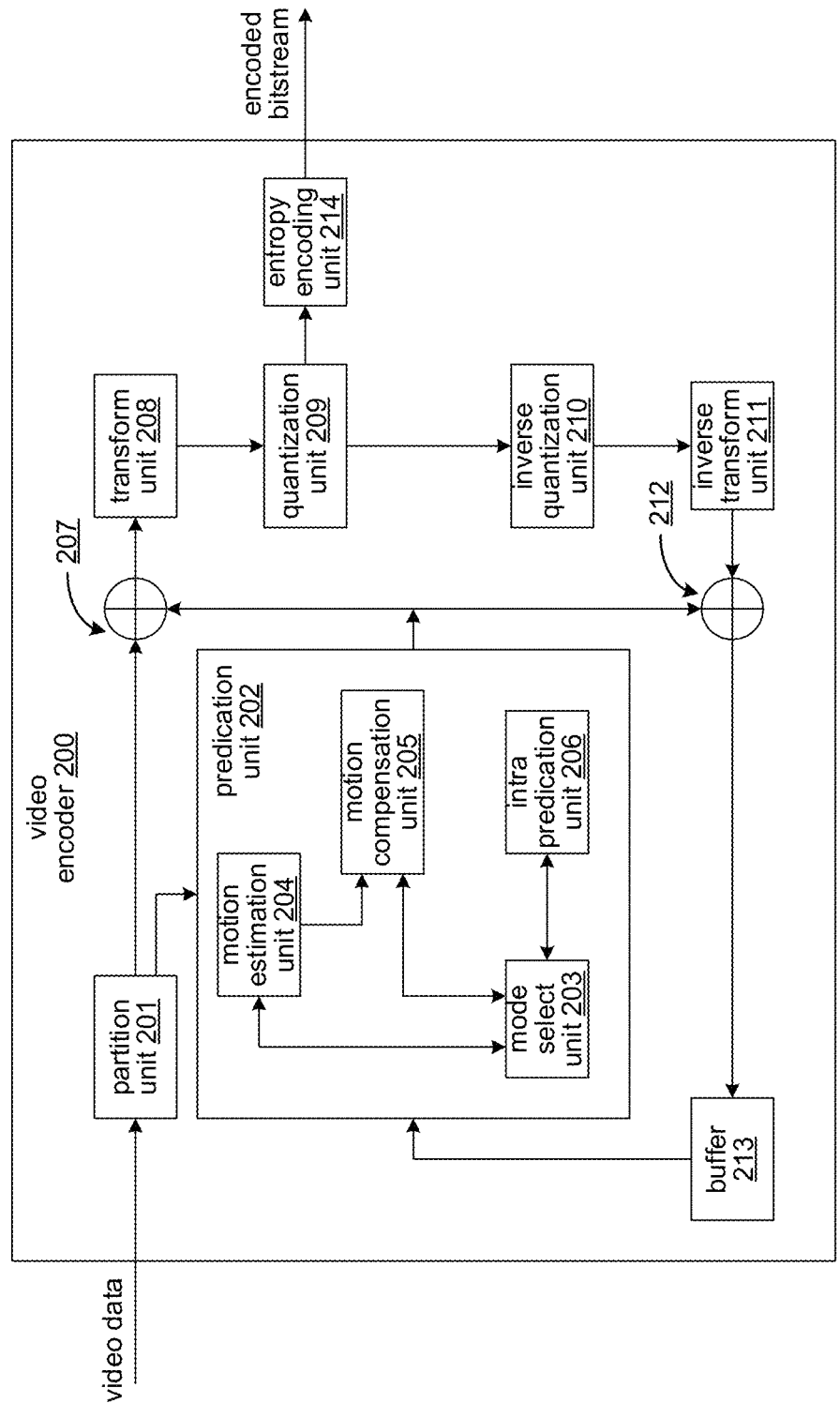
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
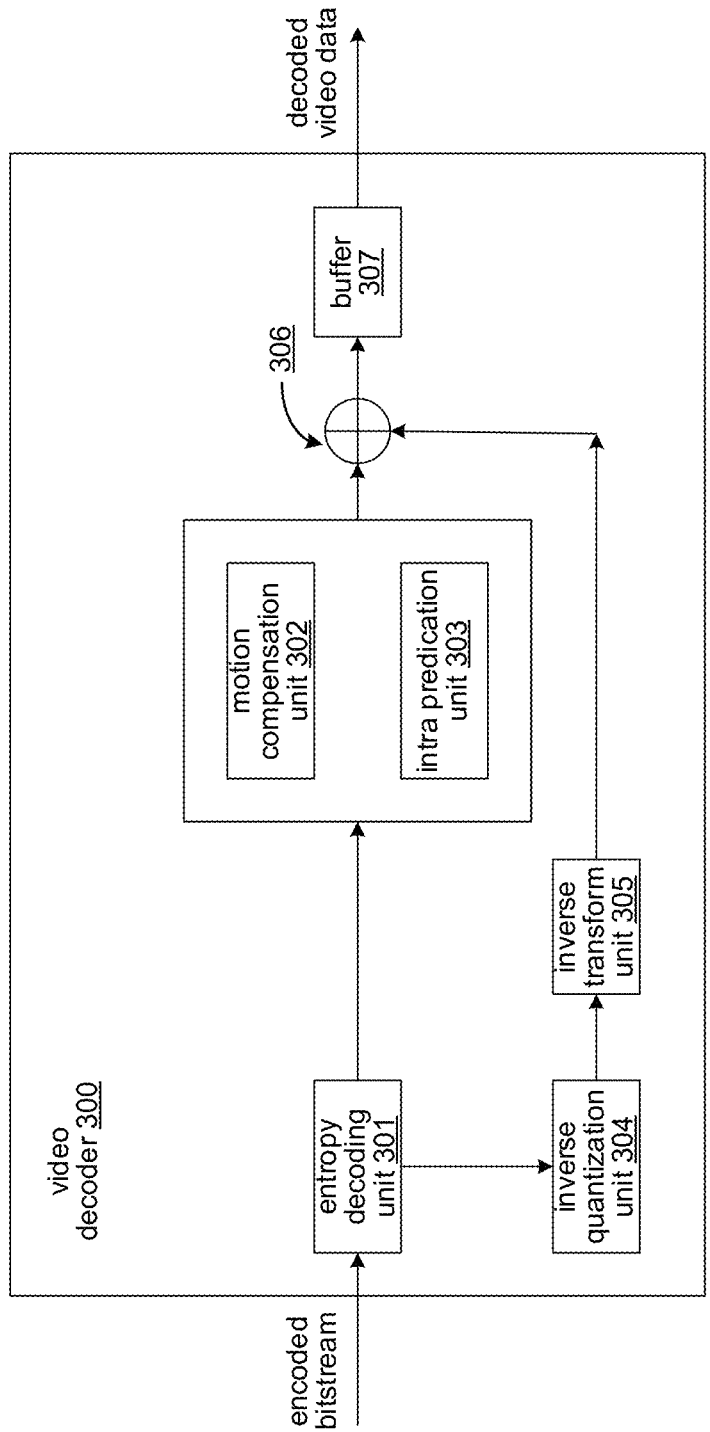
FIG. 10 is a block diagram that illustrates a decoder in accordance with some embodiments of the present disclosure.

FIG. 10 is a block diagram illustrating an example of video decoder 300 which may be video decoder 114 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (aid reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

In some embodiments, a method of video processing includes making a determination, for a conversion between a video region of a video comprising multiple component video blocks and a bitstream representation of the video, that a cross-component adaptive loop filter (CC-ALF) is used during conversion for correcting reconstructed sample values of a first component video block of a first component using reconstructed sample values of a second component video block of a second component, wherein the first component excludes Cb and Cr color representation and wherein the second component excludes a luminance (Y) component and performing the conversion based on the determination. In various embodiments, the bitstream representation may identify the first component, the video is represented using YCbCr format and wherein the first component is the Y component, or the video is represented using RGB format and wherein the first component is G component.

A listing of clauses preferred by some embodiments is provided next.

The first set of clauses show example embodiments of techniques discussed in the previous section (e.g., item 1).

Figure 11:
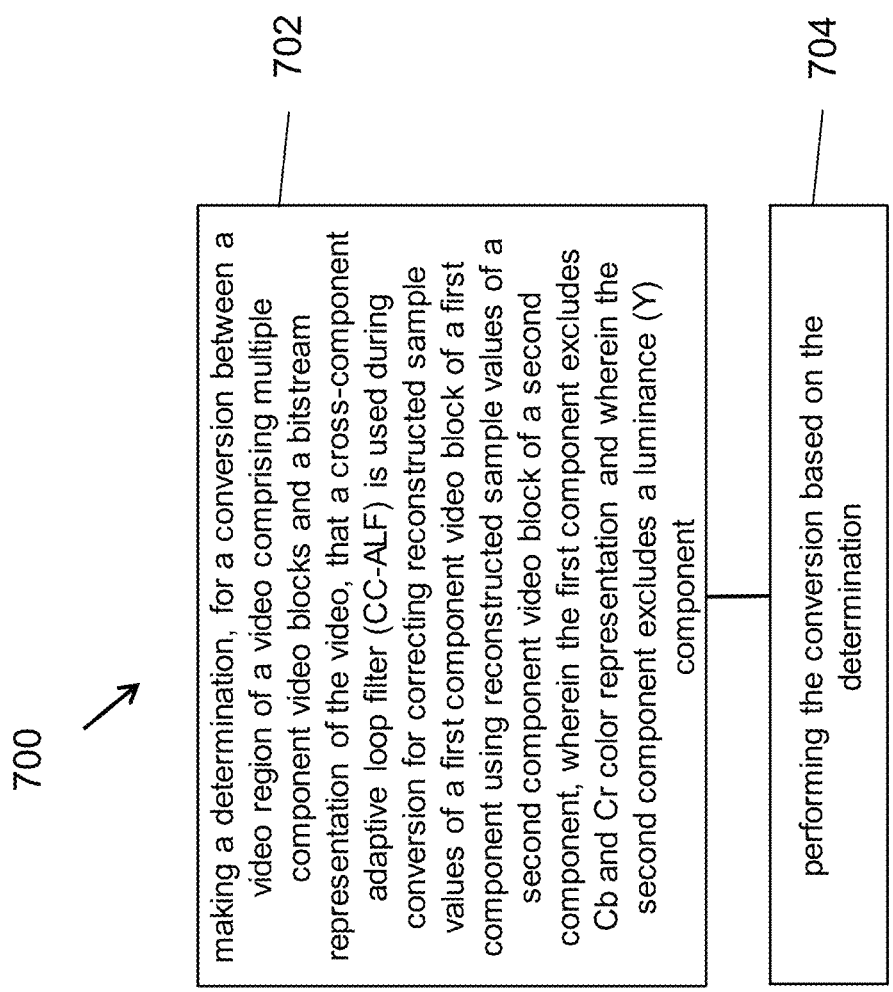
FIG. 11 is a flowchart for an example method of video processing based on some implementations of the disclosed technology.

1. A method of video processing (e.g., method 700 depicted in FIG. 11), comprising: making a determination (702), for a conversion between a video region of a video comprising multiple component video blocks and a bitstream representation of the video, that a cross-component adaptive loop filter (CC-ALF) is used during conversion for correcting reconstructed sample values of a first component video block of a first component using reconstructed sample values of video blocks of at least two components; and performing (704) the conversion based on the determination.

2. The method of clause 1, wherein one of the two components is the first component.

3. The method of clause 1, wherein the two components are different from the first component.

4 The method of clause 1, wherein CC-ALF is used based on reconstructed sample values of video blocks of three-color components.

The following clauses show example embodiments of techniques discussed in the previous section (e.g., item 4).

5. A method of video processing, comprising: making a determination, for a conversion between a video region of a video comprising multiple component video blocks and a bitstream representation of the video, to use a first a cross-component adaptive loop filter (CC-ALF) for the conversion of a first portion of the video region and a second CC-ALF for the conversion a second portion of the video region, and performing the conversion based on the determination; wherein the first CC-ALF is used for correcting reconstructed sample values of a first component of the first portion of the video region using reconstructed sample values of a second component of the first portion of the video region; and wherein the second CC-ALF is used for correcting reconstructed sample values of a third component of the second portion of the video region using reconstructed sample values of a fourth component of the second portion of the video region.

6. The method of clause 5, wherein the bitstream representation includes an indication of use of multiple CC-ALFs and/or the first CC-ALF and/or the second CC-ALF.

7. The method of clause 6, wherein the indication is included at a coding tree block or a coding unit or a prediction unit or a prediction block or a coding tree block row level.

8. The method of any of clauses 5-7, wherein the conversion includes classifying samples of the first component or the third component into multiple set and determining a characteristic of the first CC-ALF and/or the second CC-ALF based on the classifying.

9. The method of any of clauses 5-7, wherein the first and third component is the same; and the second and fourth component is the same.

The following clauses show example embodiments of techniques discussed in the previous section (e.g., item 7).

10. A method of video processing, comprising: determining that a cross-component adaptive loop filter (CC-ALF) is used at an M×N sub-block level fora conversion between a video block of a video comprising multiple components and a bitstream representation of the video, and deriving a first offset from samples of at least a second component for one M×N sub-block; and performing the conversion based on the determining, wherein M and N are positive integers; and wherein the CC-ALF is used for correcting the M×N sub-block samples for a first component of the video at least based on the first offset.

11. The method of clause 10, wherein the CC-ALF uses the first offset value for all samples in the M×N sub-block.

12. The method of clause 10, wherein the CC-ALF uses multiple final offset values for samples in the M×N sub-block while the final offset is derived from the first offset.

13. The method of any of clauses 10-12, wherein M and N depend on a color format of the video.

14. The method of any of clauses 10-13, wherein a conversion of another video block of the video uses sub-blocks of a different size for the conversion.

15. The method of any of clauses 10-13, wherein M×N=2×2 or M×N=2×1 or M×N=1×2.

The following clauses show example embodiments of techniques discussed in the previous section (e.g., item 10).

16. A method of video processing, comprising: determining that a rule of exclusion is applicable to a conversion between a current video block of a video and a bitstream representation of the video, wherein the rule of exclusion specifies that the conversion disallows using a coding tool and a cross-component adaptive loop filter coding tool together for the current video block; and performing the conversion based on the determining.

17. The method of clause 16, wherein the coding tool comprises a sample adaptive offset coding tool for chroma components.

18. The method of clause 16, wherein the coding tool comprises a residual scaling tool for a luma mapping with chroma scaling coding tool.

19. The method of clause 16, wherein the coding tool comprises a deblocking process or an adaptive loop filter for chroma samples.

20. The method of any of clause 16-19, wherein the rule of exclusion is signaled as a field in the bitstream representation.

The following clauses show example embodiments of techniques discussed in the previous section (e.g., item 15).

21. A method of video processing, comprising: determining an order in which a cross-component adaptive loop filter (CC-ALF) and one or more loop filters are applied to reconstructed samples of a video block of a video during a conversion between the video block and a bitstream representation of the video; and performing the conversion according to the order; wherein the order excludes using the CC-ALF after a sample adaptive offset tool and before an adaptive loop filter tool.

22. The method of clause 21, wherein the order specifies to apply the CC-ALF to reconstructed samples prior to applying any other loop filters.

23. The method of clause 21, wherein the order specifies to apply the CC-ALF to reconstructed samples of a video block prior to using for prediction of subsequent video blocks of the video during the conversion.

24. The method of any of clauses 21-23, wherein the order specifies to use the CC-ALF prior to a sample adaptive offset loop filter.

25. The method of any of clauses 1 to 24, wherein the conversion comprises encoding the video into the coded representation.

26. The method of any of clauses 1 to 25, wherein the conversion comprises decoding the coded representation to generate pixel values of the video.

27. A video decoding apparatus comprising a processor configured to implement a method recited in one or more of clauses 1 to 26.

28. A video encoding apparatus comprising a processor configured to implement a method recited in one or more of clauses 1 to 26.

29. A computer program product having computer code stored thereon, the code, when executed by a processor, causes the processor to implement a method recited in any of clauses 1 to 26.

30. A method, apparatus or system described in the present document.

The second set of clauses describe certain features and aspects of the disclosed techniques in the previous section (e.g., items 1 to 7).

Figure 12A:
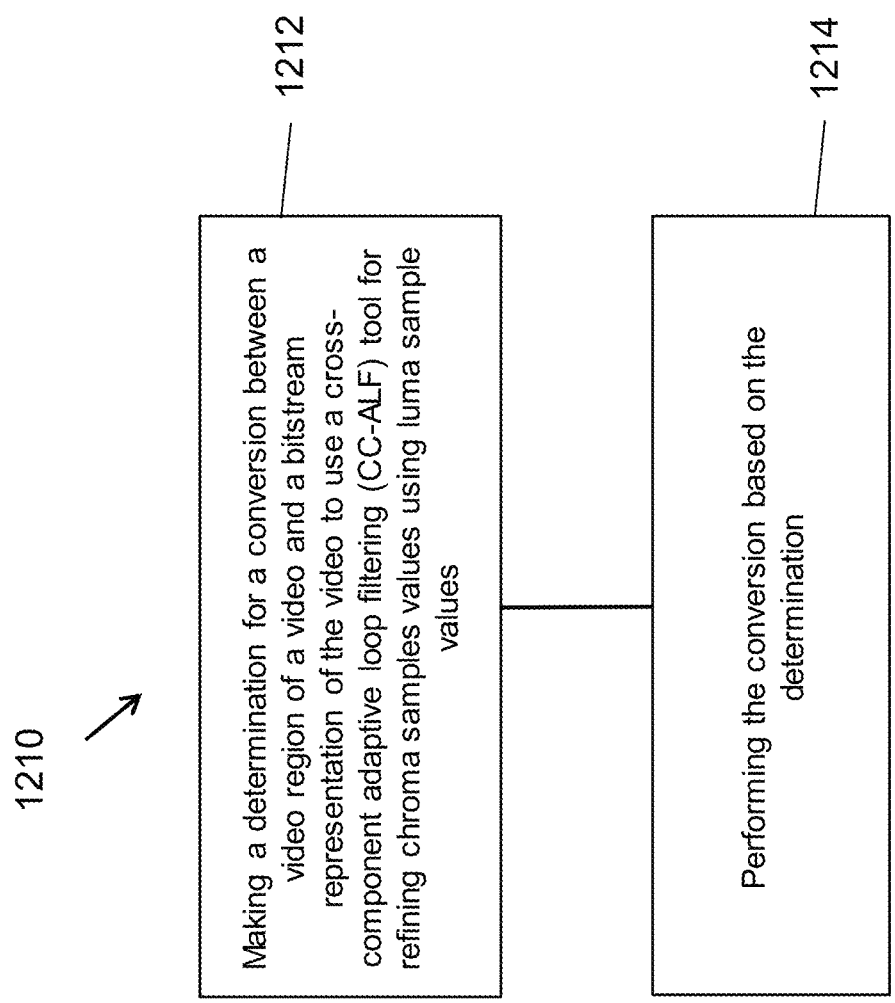
FIGS. 12A to 12D are flowcharts for example methods of video processing based on some implementations of the disclosed technology.

1. A method of video processing (e.g., method 1210 depicted in FIG. 12A), comprising: making (1212) a determination fora conversion between a video region of a video and a bitstream representation of the video to use a cross-component adaptive loop filtering (CC-ALF) tool for refining chroma samples values using luma sample values; and performing (1214) the conversion based on the determination, wherein the refining includes correcting the chroma sample values using a final refinement that is a further refinement of a first refinement value determined by selectively filtering the luma sample values.

2. The method of clause 1, wherein the further refinement of the first refinement value includes clipping the first refinement value to a given range.

3. The method of clause 2, wherein the bitstream representation includes information indicating whether to and/or how to clip the first refinement.

Figure 12B:
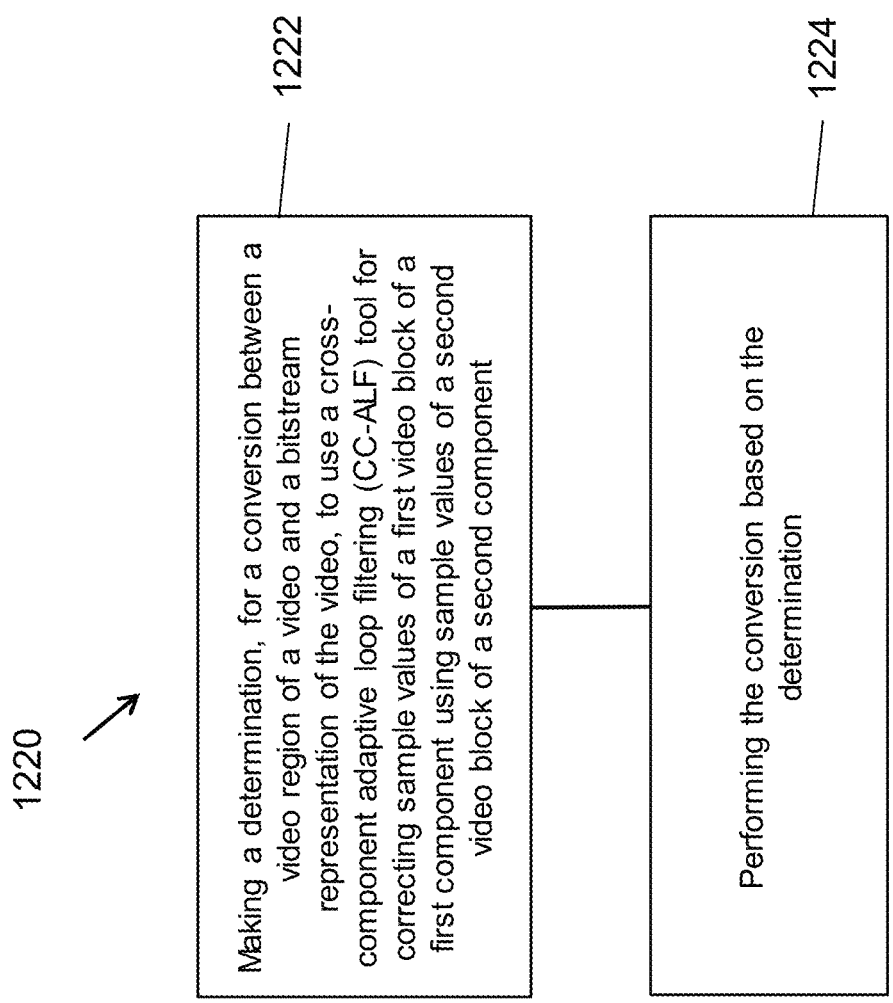

4. A method of video processing (e.g., method 1220 depicted in FIG. 12B), comprising: making (1222) a determination, fora conversion between a video region of a video and a bitstream representation of the video, to use a cross-component adaptive loop filtering (CC-ALF) tool for correcting sample values of a first video block of a first component using sample values of a second video block of a second component; and performing (1224) the conversion based on the determination; wherein the CC-ALF tool is used except a case satisfying both 1) that wherein the first component is a Cr or Cb component and 2) that the second component is a Y component.

5. The method of clause 4, wherein the bitstream representation identifies the first component.

6. The method of clause 4, wherein at least one of the first component and the second component is Y component in the first video block represented in YCbCr format or G component in the first video block represented in RGB format.

7. The method of clause 4, wherein at least one of the first component and the second component is Cb component in the first video block represented in YCbCr format or B component in the first video block represented in RGB format.

8. The method of clause 4, wherein at least one of the first component and the second component is Cr component in the first video block represented in YCbCr format or R component in the first video block represented in RGB format.

9. The method of clause 4, wherein the CC-ALF tool is used to refine the sample values of the first video block further using samples values of a third video block of a third component, the second component and the third component being different from the first component, and wherein samples from the second component and the third component are filtered when correcting the sample values of the first component.

10. The method of clause 9, wherein the first component is Cb in first video block represented using YCbCr format, and the second component and the third component are a Y component and a Cr component, respectively.

11. The method of clause 9, wherein the first component is Cr in the first video block represented using YCbCr format, and the second component and third component are a Y component and a Cb component, respectively.

12. The method of clause 9, wherein the first component is Y in the first video block represented using YCbCr format, and the second component and the third component are a Cb component and a Cr component, respectively.

13. The method of clause 9, wherein the first component is G in the first video block represented using RGB format, and the second component and the third component are a R component and a B component, respectively.

14. The method of clause 9, wherein the first component is B in the first video block represented using RGB format, and the second component and the third component are a R component and a G component, respectively.

15. The method of clause 9, wherein the first component is R in the first video block represented using RGB format, and the second component and the third component are a G component and a B component, respectively.

16. The method of clause 4, wherein the CC-ALF tool is used to refine the sample values of the first video block further using samples values of a third video block of a third component, one of the second component and the third component being same as the first component, and wherein samples from the second component and the third component are filtered when correcting the sample values of the first component.

17. The method of clause 16, wherein the first component is Cb in the first component video block represented using YCbCr format, and the second component and the third component are a Cb component and a Y component, respectively.

18. The method of clause 16, wherein the first component is Cb in the first component video block represented using YCbCr format, and the second component and the third component are a Cb component and a Cr component, respectively.

19. The method of clause 16, wherein the first component is Cr in the first component video block represented using YCbCr format, and the second component and the third component are a Cr component and a Y component, respectively.

20. The method of clause 16, wherein the first component is Cr in the first component video block represented using YCbCr format, and the second component and the third component are a Cr component and a Cb component, respectively.

21. The method of clause 16, wherein the first component is Y in the first component video block represented using YCbCr format, and the second component and the third component are a Y component and a Cb component, respectively.

22. The method of clause 16, wherein the first component is Y in the first component video block represented using YCbCr format, and the second component and the third component are a Y component and a Cr component, respectively.

23. The method of clause 16, wherein the first component is G in the first component video block represent using RGB format, and the second component and the third component are a G component and a R component, respectively.

24. The method of clause 16, wherein the first component is G in the first component video block represented using RGB format, and the second component and the third component are a G component and a B component, respectively.

25. The method of clause 16, wherein the first component is B in the first component video block represented using RGB format, and the second component and the third component are a B component and a R component, respectively.

26. The method of clause 16, wherein the first component is B in the first component video block represented using RGB format, and the second component and the third component are a B component and a G component, respectively.

27. The method of clause 16, wherein the first component is R in the first component video block represented using RGB format, and the second component and the third component are a R component and a G component, respectively.

28. The method of clause 16, wherein the first component is R in the first component video block represented using RGB format, and the second component and the third component are a R component and a B component, respectively.

29. The method of clause 4, wherein the CC-ALF tool further uses sample values of a third video block of a third component, the first to third components being different from one another, and wherein the sample values of the first video block are refined based on filtered sample values of the first to third video blocks.

30. The method of clause 29, wherein the first component is Cb, Cr, or Y in the first component video block represented using YCbCr format.

31. The method of clause 29, wherein the first component is G, R, or B in the first component video block represented using RGB format.

32. The method of clause 29, wherein the first to third components are Y, Cb, and Cr components that are in a YCbCr format.

33. The method of clause 29, wherein the first to third components are R, G, and B components that are in a RGB format.

34. The method of clause 29, wherein the bitstream representation includes at least one of i) indications of the first to third components and/or ii) a number of components to be filed for an offset derivation.

35. A method of video processing, comprising: making a determination, for a conversion between a video unit of a video and a bitstream representation of the video to use a cross-component adaptive loop filtering (CC-ALF) tool for correcting sample values of a first component using sample values of a second component according to a rule; and performing the conversion based on the determination; wherein the rule specifies to use two or more ALF adaptation parameter sets (APSs) that include a first ALF APS and a second ALF APS in the bitstream representation.

36. The method of clause 35, wherein the first APS and the second APS are same.

37. The method of clause 35, wherein the first APS and the second APS are different from each other.

38. The method of clause 35, wherein the video unit corresponds to a slice or a picture of the video.

39. The method of clause 35, wherein the rule specifies that the two or more ALF APSs include a first ALF APS applied to a first sample in the video unit and a second ALF APS applied to a second sample in the video unit.

40. The method of clause 35, wherein a number of the two or more ALF APSs referred by the video unit is included in the bitstream representation.

41. The method of clause 35, wherein indices of the two or more ALF APSs referred by the video unit are included in the bitstream representation.

42. The method of clause 35, wherein a same set, a sub-set, or a super-set of the two or more ALF APSs that luma ALF filters refer to is utilized by the CC-ALF tool.

43. The method of clause 42, wherein the two or more ALF APSs used to derive the CC-ALF filters are not included in the bitstream representation.

44. The method of clause 42, wherein a difference of ALF APSs that are used to derive CC-ALF filters and the luma ALF filters is included in the bitstream representation.

45. A method of video processing, comprising: making a determination, for a conversion between a video region of a video and a bitstream representation of the video to use a cross-component adaptive loop filtering (CC-ALF) tool for correcting sample values of a first component using sample values of a second component according to a rule; and performing the conversion based on the determination; wherein the rule specifies to use two or more CC-ALF filters that include a first CC-ALF filter applied to a first sample in the video region and a second CC-ALF filter applied to a second sample in the video region.

46. The method of clause 45, wherein the bitstream representation includes indications in the video region.

47. The method of clause 45, wherein the bitstream representation includes indications in a video area that is smaller or greater than the video region.

48. The method of clause 47, wherein the video region corresponds to a coding tree block and the video area is a slice or a coding unit.

49. The method of any of clauses 45 to 48, wherein the bitstream representation includes indications comprising indices for the two or more CC-ALF filters that are selected from one ALF adaptation parameter set (APS).

50. The method of any of clauses 45 to 48, wherein the bitstream representation includes indications comprising indices for the two or more CC-ALF filters that are selected from one or more ALF APSs and indices of the one or more ALF APSs.

51. The method of any of clauses 45 to 48, wherein at least one of the two or more CC-ALF filters are selected from pre-defined fixed CC-ALF filters or inherited from the video region and wherein the bitstream representation includes indications comprising indices for selected fixed CC-ALF filters which are not in an APS.

52. The method of clause 45, wherein the conversion includes one or more processes for classifying chroma samples of one or more chroma components into multiple sets and determining a characteristic of the first CC-ALF filter and/or the second CC-ALF filter based on the classifying.

53. The method of clause 52, wherein the chroma samples of two chroma components derive the classifying independently.

54. The method of clause 52, wherein the chroma samples of two chroma components derive the classifying jointly.

55. The method of clause 52, wherein the one or more processes for classifying chroma samples of a chroma component depends on information of a corresponding luma color component.

56. The method of clause 52, wherein the one or more processes for classifying the chroma samples of the one or more chroma components depend on a joint decision based on more than one chroma component.

57. The method of clause 52, wherein the chroma samples are classified to the multiple sets based on a classification of corresponding luma samples in a luma ALF.

58. The method of clause 52, wherein indications on the first CC-ALF filter and/or the second CC-ALF filter according to a classification index is signaled.

Figure 12C:
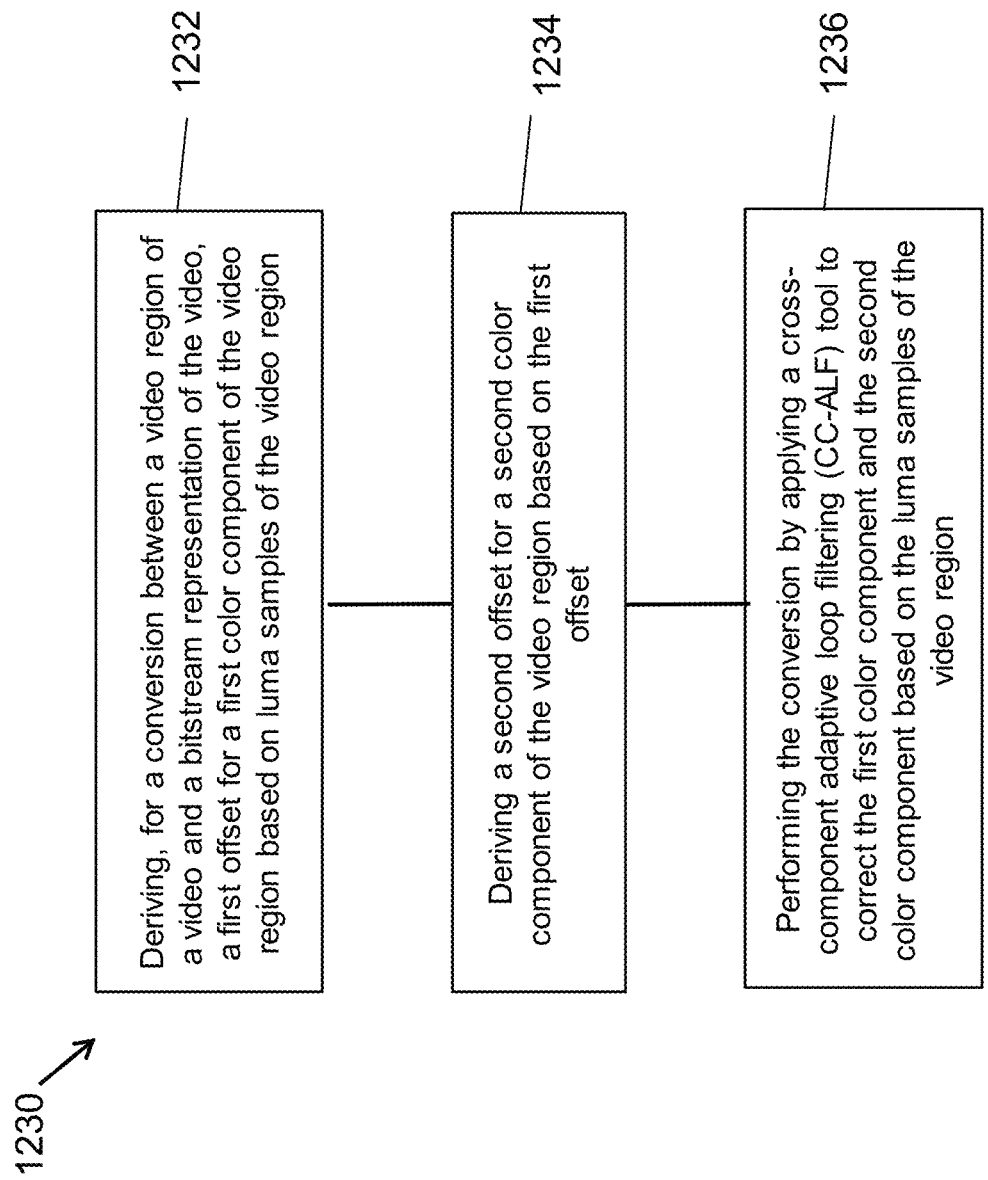

59. A method of video processing (e.g., method 1230 depicted in FIG. 12C), comprising: deriving (1232), fora conversion between a video region of a video and a bitstream representation of the video, a first offset fora first color component of the video region based on luma samples of the video region; deriving (1234) a second offset fora second color component of the video region based on the first offset; and performing (1236) the conversion by applying a cross-component adaptive loop filtering (CC-ALF) tool to correct the first color component and the second color component based on the luma samples of the video region.

60. The method of clause 59, wherein the first offset and the second offset are same as each other.

61. The method of clause 59, wherein a sum of the first offset and the second offset is equal to 0.

62. The method of clause 59, wherein the second offset is derived using a linear function of the first offset.

63. The method of clause 59, wherein the second offset is derived using a clipping operation of the first offset.

64. The method of clause 59, wherein the second offset is derived based on the first offset and a slice-level flag indicating a joint Cb and Cr mode.

65. The method of clause 59, wherein a set of CC-ALF filters are used for the first color component and the second color component.

66. The method of clause 59, wherein a correction of at least one of the first offset and the second offset is signaled or derived.

Figure 12D:
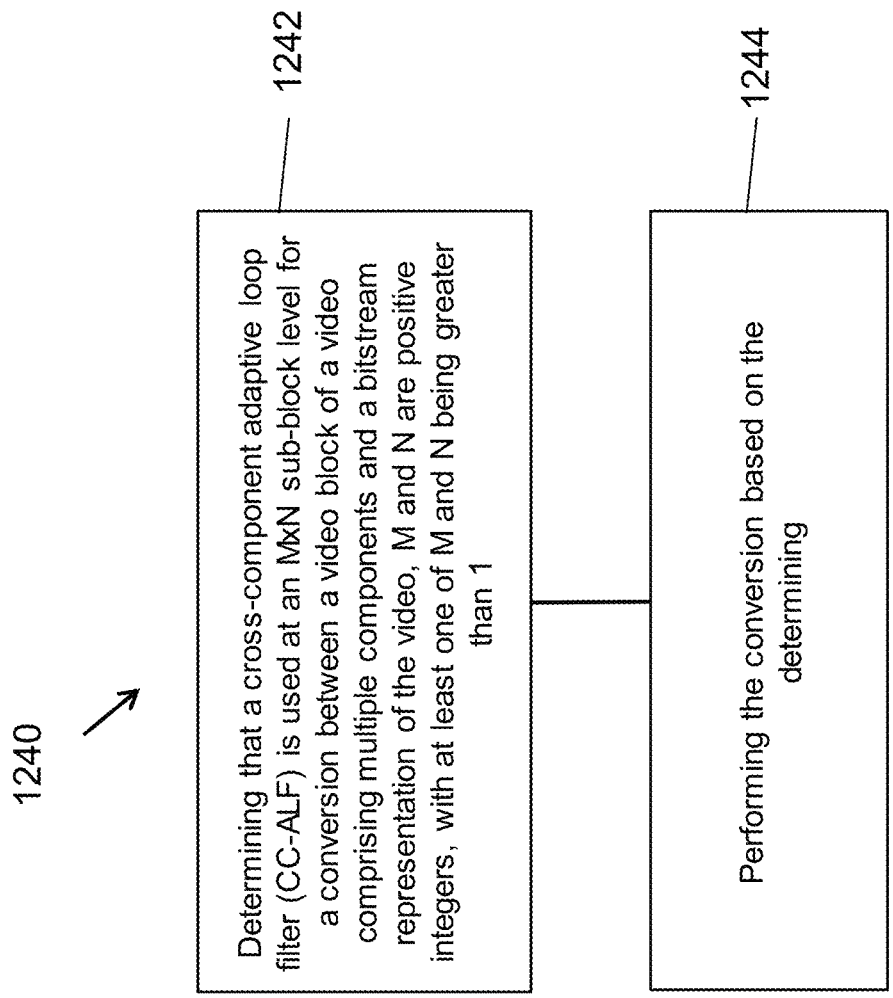

67. A method of video processing (e.g., method 1240 depicted in FIG. 12D), comprising: determining (1242) that a cross-component adaptive loop filter (CC-ALF) is used at an M×N sub-block level for a conversion between a video block of a video comprising multiple components and a bitstream representation of the video, M and N are positive integers, with at least one of M and N being greater than 1; and performing (1244) the conversion based on the determining, wherein the CC-ALF tool is used for correcting M×N sub-block samples fora first component of the video based on a second component of the video.

68. The method of clause 67, further comprising deriving a first offset from samples of at least the second component for one M×N sub-block, and wherein the CC-ALF tool is used for correcting the M×N sub-block samples based on the first offset.

69. The method of clause 68, wherein the CC-ALF tool uses the first offset for all samples in the M×N sub-block.

70. The method of clause 68, wherein the CC-ALF tool uses final offsets for samples in the M×N sub-block while the final offsets are derived from the first offset.

71. The method of clause 67, wherein M and N depend on a color format of the video.

72. The method of clause 67, wherein M×N=2×2 or M×N=2×1 or M×N=1×2.

73. The method of clause 67, wherein a conversion of another video block of the video uses sub-blocks of a different size for the conversion.

74. The method of clause 67, wherein M and N depend on which color is represented by the first component.

75. The method of clause 67, wherein a CC-ALF tool support region depends on values of M and N.

76. The method of clause 67, wherein values of M and N and/or a granularity of the CC-ALF tool is signaled in a video unit of the video.

77. The method of any of clauses 1 to 76, wherein the conversion includes encoding the video into the bitstream representation.

78. The method of any of clauses 1 to 76, wherein the conversion includes decoding the bitstream representation to generate the video.

79. A video processing apparatus comprising a processor configured to implement a method recited in any one or more of clauses 1 to 78.

80. A computer readable medium storing program code that, when executed, causes a processor to implement a method recited in any one or more of clauses 1 to 78.

81. A computer readable medium that stores a coded representation or a bitstream representation generated according to any of the above described methods.

The third set of clauses describe certain features and aspects of the disclosed techniques in the previous section (e.g., item 8).

Figure 13:
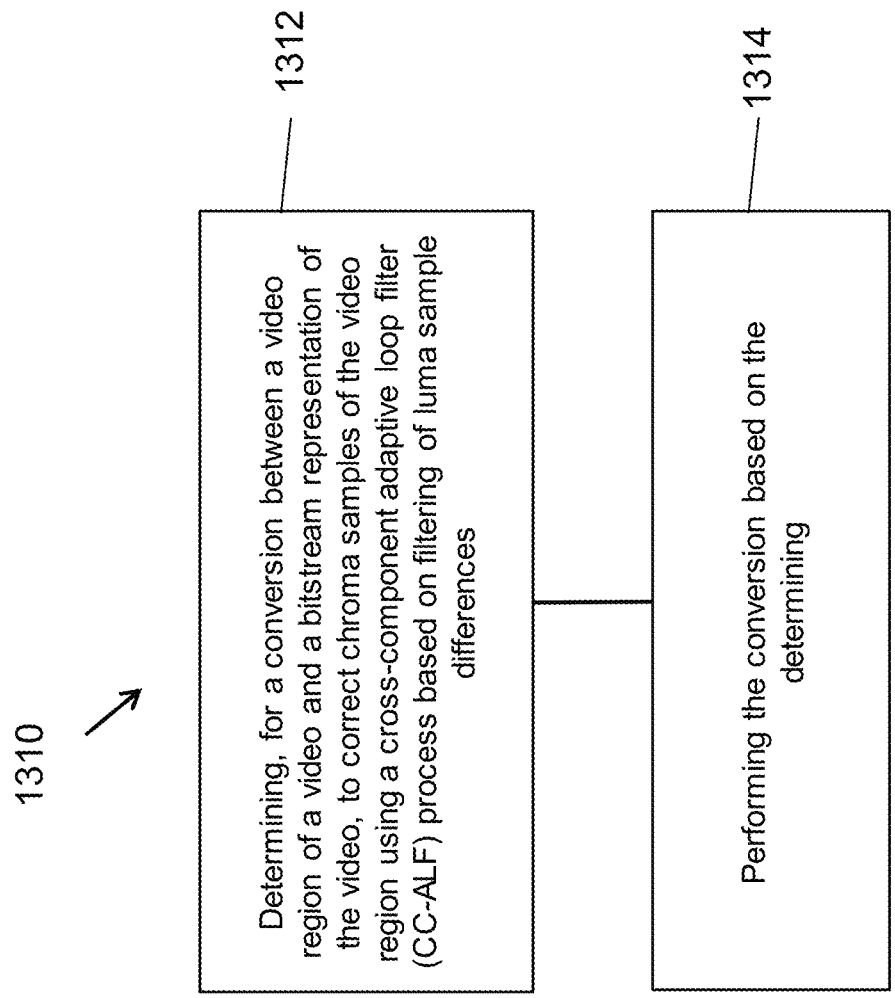
FIG. 13 is a flowchart for an example method of video processing based on some implementations of the disclosed technology.

1. A method of video processing (e.g., method 1310 depicted in FIG. 13), comprising: determining, for a conversion between a video region of a video and a bitstream representation of the video, to correct chroma samples of the video region using a cross-component adaptive loop filter (CC-ALF) process based on filtering of luma sample differences; and performing the conversion based on the determining.

2. The method of clause 1, wherein the luma sample differences correspond to differences between a value of a luma sample in a filter support region and a value of a corresponding luma sample of chroma samples of the video region.

3. The method of clause 2, wherein the corresponding luma sample is located at (x, for the video region that is in 4:4:4: format, and wherein (x, y) indicates a coordinate of the chroma sample.

4. The method of clause 2, wherein the corresponding luma sample is located at (2x, 2y) for the video region that is in non-4:4:4: format, and wherein (x, y) indicates a coordinate of the chroma sample coordinate.

5. The method of clause 2, wherein the corresponding luma sample is derived as a function of two samples located at (2x, 2y) and (2x, 2y+1) for the video region that is in 4:2:0 format and, wherein (x, y) indicates a coordinate of the chroma sample.

6. The method of clause 1, wherein the luma sample differences are clipped before being used.

7. The method of clause 6, wherein the bitstream representation includes information about whether to and/or how to clip the luma sample differences.

8. The method of clause 6, wherein the bitstream representation includes clipping parameters for clipping the luma sample differences.

9. The method of clause 6, wherein a signaling method of clipping parameters in a luma ALF process is utilized to signal clipping parameters in the CC-ALF process.

10. The method of clause 1, wherein clipping parameters used in a luma ALF process is used in the CC-ALF process.

11. The method of any of clauses 1 to 10, wherein the conversion includes encoding the video into the bitstream representation.

12. The method of any of clauses 1 to 10, wherein the conversion includes decoding the bitstream representation to generate the video.

13. A video processing apparatus comprising a processor configured to implement a method recited in any one or more of clauses 1 to 12.

14. A computer readable medium storing program code that, when executed, causes a processor to implement a method recited in any one or more of clauses 1 to 12.

15. A computer readable medium that stores a coded representation or a bitstream representation generated according to any of the above described methods.

The fourth set of clauses describe certain features and aspects of the disclosed techniques in the previous section (e.g., items 9-20).

Figure 14A:
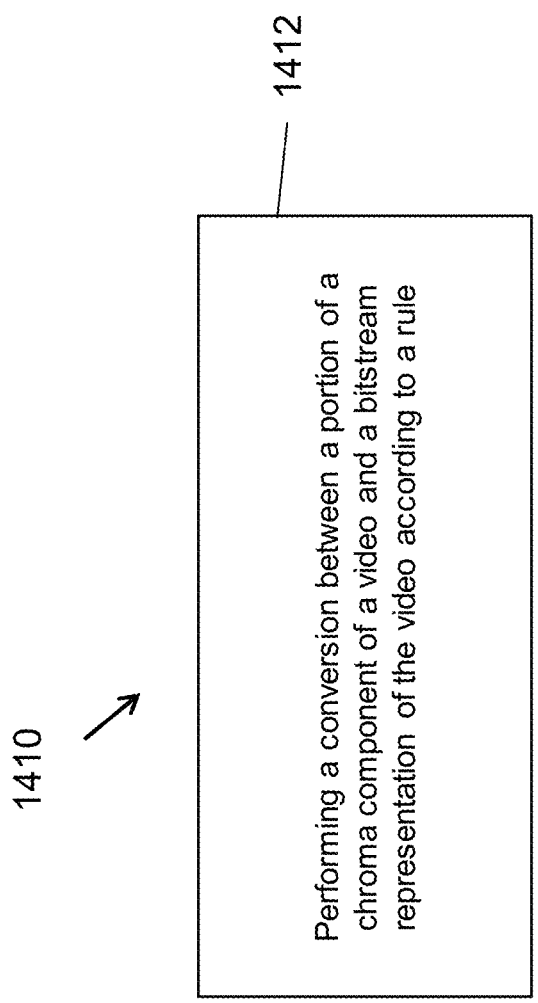

1. A method of video processing (e.g., method 1410 shown in FIG. 14A), comprising: performing (1412)a conversion between a portion of a chroma component of a video and a bitstream representation of the video according to a rule, wherein the rule specifies that whether a cross-component adaptive loop filtering (CC-ALF) tool is available for the conversion of the portion of the video is dependent on whether an availability or a use of an adaptive loop filtering (ALF) tool is indicated for a corresponding portion of a luma component.

2. The method of clause 1, wherein the portion of the chroma component corresponds to a video region or a video unit.

3. The method of clause 2, wherein the video region corresponds to a coding tree block.

4. The method of clause 2, wherein the video unit corresponds to a sequence or a picture or a slice of the video.

5. The method of clause 1, wherein the rule specifies that the CC-ALF tool is not available in a case that ALF parameters are not signaled for the corresponding portion of the luma component.

6. The method of clause 1, wherein signaling of information related to the CC-ALF tool is based on the use of the ALF tool for the corresponding portion of the luma component.

7. The method of clause 1, wherein the bitstream representation omits information related to the CC-ALF tool in case that the ALF tool for the corresponding portion of the luma component is disabled.

8. The method of clause 6, wherein signaling of information related to CC-ALF tool in a slice level is dependent on the use of the ALF tool for the corresponding portion of the luma component in the slice level.

9. The method of clause 6, wherein signaling of information related to CC-ALF tool in a coding tree block (CTB) level is dependent on the use of the ALF tool for the corresponding portion of the luma component in the CTB level.

10. The method of clause 6, wherein the information related to the CC-ALF tool is signaled using a syntax element corresponding to i) slice_cross_component_alf_cb_enabled_flag, ii) slice_cross_component_alf_cr_enabled_flag, iii) alf_ctb_cross_component_cb_idc, or iv) alf_ctb_cross_component_cr_idc.

11. The method of clause 6, wherein the use of the ALF tool for the corresponding portion of the luma component is signaled using a syntax element corresponding to i) slice_alf_enabled_flag or ii) alf_ctb_flag.

12. The method of clause 1, wherein signaling of information related to the CC-ALF tool is skipped in a case that ALF parameters are not signaled for the corresponding portion of the luma component.

13. The method of clause 1, wherein the rule specifies that the CC-ALF tool is disabled for the portion of the chroma component in a case that the ALF tool is disabled for the corresponding portion of the luma component.

14. A method of video processing, comprising: performing a conversion between a video region of a video and a bitstream representation of the video, wherein the bitstream representation conforms to a format rule that specifies that whether a syntax element to indicate usage of a cross-component adaptive loop filtering (CC-ALF) tool in the bitstream representation is included depends on a number of available adaptive loop filtering (ALF) adaptation parameter sets (APSs).

15. The method of clause 14, wherein the format rule specifies that the syntax element is included in the bitstream representation in a case that the number of ALF APSs is unequal to 0 or greater than 0.

16. The method of clause 14, wherein the format rule specifies that the syntax element is omitted in the bitstream representation in a case that the number of ALF APSs is 0.

17. The method of clause 14, wherein the format rule specifies that a conformance bitstream satisfies that an APS index for the CC-ALF tool and/or an ALF tool is no smaller than a number of ALF APSs transmitted.

18. The method of clause 14, wherein the format rule specifies that a conformance bitstream satisfies that an APS index for the CC-ALF tool and/or an ALF tool refers to one available ALF APS.

19. The method of clause 14, wherein the ALF APSs contain information related to the CC-ALF tool.

20. A method of video processing, comprising: performing a conversion between a video unit of a video and a bitstream representation of the video, wherein the bitstream representation conforms to a format rule that specifies an applicability of a cross-component adaptive loop filtering (CC-ALF) tool to refine sample values of a first component using sample values of a second component is included in the bitstream representation at a video unit level that is different from a slice level.

21. The method of clause 20, wherein the vide unit corresponds to a sequence, a picture, a view, a subpicture, or a tile and does not correspond to a slice.

22. The method of clause 20, wherein the format rule further specifies that an indication of usage of the CC-ALF tool is signaled based on an enablement of an ALF tool.

23. The method of clause 20, wherein the format rule further specifies that an indication of usage of the CC-ALF tool is signaled based on a chroma color format and/or a syntax element indicating that a video block of the video unit contains both luma and chroma samples.

24. The method of clause 20, wherein the format rule further specifies that an indication of usage of the CC-ALF tool is included in the bitstream representation based on a chroma color format and/or a usage of separate color plane coding.

25. The method of clause 20, wherein the format rule further specifies that an indication of usage of the CC-ALF tool in a video region corresponding to a slice, coding tree block, or a coding tree unit is included in the bitstream representation based on the applicability of the CC-ALF tool for the video unit.

26. The method of clause 20, wherein the format rule further specifies that a syntax element indicating the applicability of the CC-ALF tool is signaled in a sequence parameter set (SPS), a video parameter set (VPS), a picture parameter set (PPS), a picture header, or a slice header.

27. The method of clause 26, wherein the syntax element is coded only when an ALF tool is enabled for the video unit.

28. The method of clause 26, wherein the syntax element is coded only for a condition satisfying both of i) that an ALF tool is enabled for the video unit and ii) that a variable, ChromaArrayType, is unequal to 0.

29. The method of clause 26, wherein the syntax element is coded only for a condition satisfying both of i) that an ALF is enabled for the video unit and ii) that the chroma format of the video unit is monochrome.

30. A method of video processing, comprising: performing a conversion between a video region of a video and a bitstream representation of the video, wherein the bitstream representation conforms to a format rule that specifies whether a syntax element to indicate usage of a cross-component adaptive loop filtering (CC-ALF) tool in the bitstream representation depends on an availability of an adaptive loop filtering (ALF) tool used for a corresponding portion of a luma component.

31. The method of clause 30, wherein the format rule specifies that the CC-ALF tool is disabled without being explicitly signaled in a case that the ALF tool is not available for the corresponding portion of the luma component.

32. A method of video processing, comprising: performing a conversion between a video region of a video and a bitstream representation of the video, wherein the bitstream representation conforms to a format rule specifying that the bitstream representation includes an adaptation parameter set (APS) including a syntax element to indicate whether the APS contains information related to a cross-component adaptive filtering CC-ALF tool.

33. The method of clause 32, wherein the APS including the information related to the CC-ALF tool has a type different from another APS without the information related to the CC-ALF type.

34. The method of clause 32, wherein the syntax element corresponds to a combination of a first syntax element related to the CC-ALF tool applied to a Cb component and a second syntax element related to the CC-ALF tool applied to a Cr component.

35. The method of clause 32, wherein the syntax element has a non-binary value.

36. A method of video processing (e.g., method 1420 shown in FIG. 14B), comprising: determining that a rule of exclusion is applicable to a conversion between a video region of a video and a bitstream representation of the video, wherein the rule of exclusion specifies that the conversion disallows using a coding tool and a cross-component adaptive loop filtering (CC-ALF) tool together for the video region; and performing the conversion based on the determining.

37. The method of clause 36, wherein the coding tool comprises a sample adaptive offset coding tool for chroma components, a residual scaling tool for a luma mapping with chroma scaling coding tool, a deblocking process for the chroma components, or an adaptive loop filter for the chroma components.

38. The method of clause 36, wherein the bitstream representation includes information related to the CC-ALF tool depending on an enablement status of the coding tool.

39. The method of clause 36, wherein the bitstream representation includes information related to the coding tool depending on an enablement status of the CC-ALF tool.

40. The method of clause 36, wherein the bitstream represent conforms to a format rule that specifies to omit information related to the coding tool in case that the coding tool is disabled.

41. The method of clause 36, wherein the bitstream representation conforms to a format rule that specifies to omit information related to the CC-ALF tool in case that the CC-ALF tool is disabled.

42. The method of clause 36, wherein the video region corresponds to a whole sequence, a whole picture, a whole slice, a tile, a sub-picture, a coding tree block, or a coding block.

43. A method of video processing, comprising: performing, fora conversion between a chroma block of a video and a bitstream representation of the video according to a rule, wherein a cross-component adaptive loop filter (CC-ALF) tool is used during the conversion for determining a prediction of the chroma block based on samples of a luma block; wherein the rule specifies that the luma block used for the prediction and/or an order in which the CC-ALF tool is used during the conversion.

44. The method of clause 43, wherein the rule specifies to apply the CC-ALF tool during a prediction stage for predicting sample values of the chroma block.

45. The method of clause 44, wherein a prediction error is generated based on differences between an original signal before the CC-ALF tool is applied and CC-ALF filtered results.

46. The method of clause 44, wherein a reconstruction of the chroma block is dependent on CC-ALF filtered results and residuals.

47. The method of clause 44, wherein the rule is applied for partial samples in the chroma block but is not applied for remaining samples in the chroma block.

48. The method of clause 47, wherein the partial samples correspond to samples at first N rows or columns or samples at last N rows or columns.

49. The method of clause 48, wherein N is dependent on a filter shape used in the CC-ALF tool.

50. The method of clause 43, wherein the rule specifies to apply the CC-ALF tool after reconstruction of the chroma block before decoding another block.

51. The method of clause 43, wherein the rule specifies that the order excludes using the CC-ALF tool after a sample adaptive offset tool and before an adaptive loop filter tool.

52. The method of clause 43, wherein the rule specifies to apply the CC-ALF tool prior to applying any other loop filter.

53. The method of clause 43, wherein the rule specifies to apply the CC-ALF tool to reconstructed samples of the chroma block prior to using for prediction of subsequent video blocks of the video.

54. The method of clause 43, wherein the rule specifies to apply the CC-ALF tool prior to a sample adaptive offset loop filter.

Figure 14C:
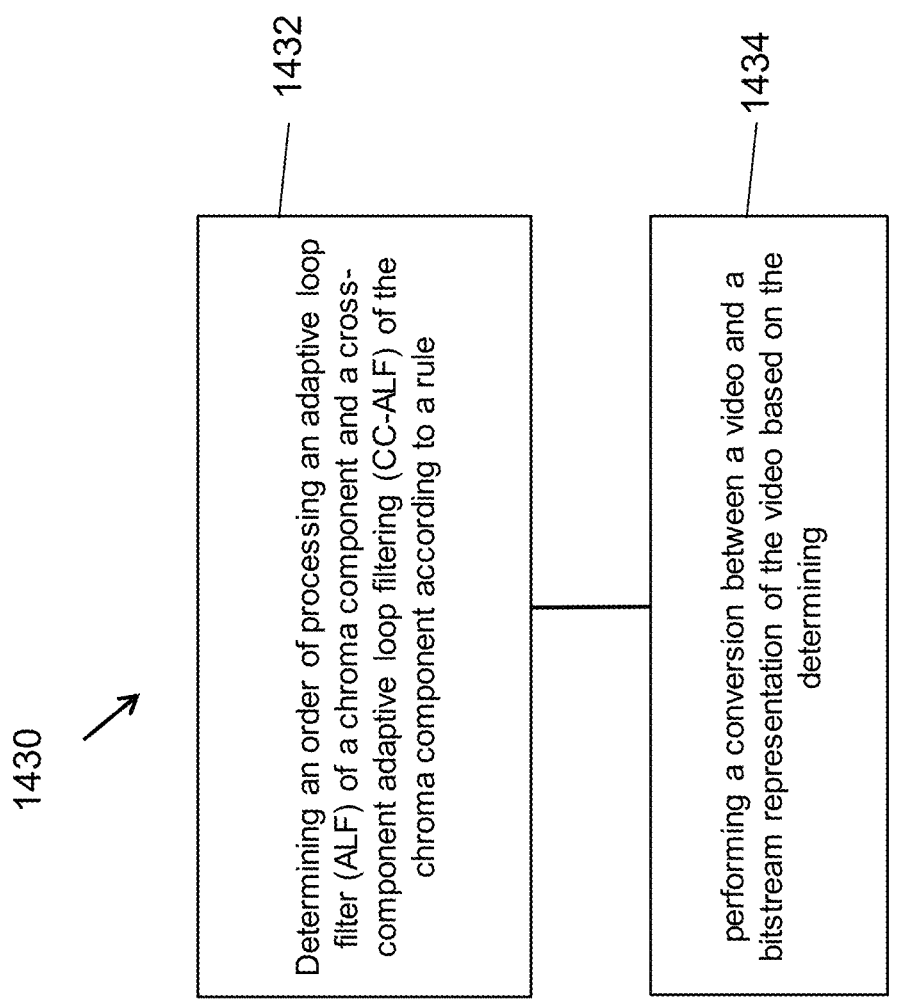

55. A method of video processing (e.g., method 1430 shown in FIG. 14C), comprising: determining (1432) an order of processing an adaptive loop filter (ALF) of a chroma component and a cross-component adaptive loop filtering (CC-ALF) of the chroma component according to a rule; and performing (1434) a conversion between a video and a bitstream representation of the video based on the determining, wherein the rule specifies whether the order is predefined or adaptively changed at a video region of the video, the video region having a size of M×N and M and N being positive integers.

56. The method of clause 55, wherein filtered samples obtained after processing the ALF on a M×N region are modified before applying the CC-ALF on the M×N region.

57. The method of clause 55, wherein filtered samples obtained after processing the ALF or the CC-ALF on a first M×N region are utilized as inputs to a second M×N region.

58. The method of clause 55, wherein the CC-ALF of the chroma component on a M×N region is performed first and then the ALF of the chroma component on the M×N region is performed.

59. The method of clause 58, wherein an output of the CC-ALF is provided as an input of the ALF.

60. The method of clause 58, wherein samples in the M×N region is modified by the CC-ALF before being provided as an input to the ALF.

61. The method of clause 55, wherein the video region corresponds to a coding tree block (CTB) or is smaller than the CTB.

62. The method of clause 55, wherein the order is signaled in a sequence parameter set (SPS), a video parameter set (VPS), a picture parameter set (PPS), a dependency parameter set (DPS), a picture header, or a slice header.

63. A method of video processing, comprising: performing a conversion between a video region of a video and a bitstream representation of the video, wherein the bitstream representation conforms to a format rule that specifies an inclusion of a syntax element in the bitstream representation, the syntax element indicating usage of an adaptive loop filtering (ALF) and a cross-component adaptive loop filtering (CC-ALF) for one chroma component.

64. The method of clause 63, wherein the syntax element has a value that is non-binary.

65. The method of clause 64, wherein the value being equal to K indicates that the ALF and the CC-ALF are disabled for the one color component, the ALF being non-linear and K being an integer.

66. The method of clause 64, wherein the value being equal to L indicates that the ALF and the CC-ALF are enabled for the one color component, the ALF being non-linear and L being an integer.

67. The method of clause 64, wherein the value being equal to M indicates that only non-linear ALF is enabled while the CC-ALF is disabled for the given color component, M being an integer.

68. The method of clause 64, wherein the value being equal to N indicates that only CC-ALF is enabled while non-linear ALF is disabled for the one color component, N being an integer.

69. The method of any of clauses 65 to 68, wherein K, L, M, N are four integer values that are different from one another.

70. The method of clause 63, wherein the syntax element has a value that is coded with a fixed length binarization, a unary binarization, a truncated unary binarization, or a k-th order Exp-Golomb binarization.

71. The method of any of previous clauses, wherein the method is further based on at least one of: 1) a type of video contents, 2) a message signalled in a sequence parameter set (SPS), a video parameter set (VPS), a picture parameter set (PPS), a dependency parameter set (DPS), an adaptation parameter set (APS), a picture header, a slice header, a tile group header, a largest coding unit (LCU), a coding unit (CU), a LCU row, a group of LCUs, a transform unit (TU), a prediction unit (PU) block, or a video coding unit, 3) a position of CU, PU, TU, block, or video coding unit, 4) decoded information of a current block and/or a neighboring block, 5) a dimension or shape of the current block and/or the neighboring block, 6) an indication of a color format, 7) a coding tree structure, 8) a slice type, a tile group type, and/or a picture type, 9) a type of a color component, 10) a temporal layer identifier, 11) profiles, levels, or tiers of a standard.

72. The method of any of previous clauses, wherein the CC-ALF tool is applied to refine sample values of a first component using sample values of a second component.

73. The method of any of clauses 1 to 72, wherein the conversion includes encoding the video into the bitstream representation.

74. The method of any of clauses 1 to 72, wherein the conversion includes decoding the bitstream representation to generate the video.

75. A video processing apparatus comprising a processor configured to implement a method recited in any one or more of clauses 1 to 74.

76. A computer readable medium storing program code that, when executed, causes a processor to implement a method recited in any one or more of clauses 1 to 74.

77. A computer readable medium that stores a coded representation or a bitstream representation generated according to any of the above described methods.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
deriving, for a conversion between a video region of a video and a bitstream of the video, a first offset used in a cross-component filtering tool for a chroma sample of the video region, wherein the first offset is derived based on values of luma samples in a filter support region and filter coefficients, wherein the filter support region used for the cross-component filtering tool is a diamond shaped luma region;
deriving a second offset used in the cross-component filtering tool for the chroma sample based on using a clipping operation to the first offset, wherein the second offset is clipped to a given range; and
performing the conversion by applying the cross-component filtering tool to refine the chroma sample by adding the second offset offset to a value of the chroma sample, wherein the value of the chroma sample is modified by a chroma adaptive loop filter process before a refinement by the cross-component filtering tool.

2. The method of claim 1, wherein the first offset is derived based on applying filtering coefficients on luma sample differences, and
wherein each luma sample difference corresponds to a difference between a value of a luma sample in a filter support region and a value of a corresponding luma sample of the chroma sample.

3. The method of claim 2, wherein the corresponding luma sample is located at (x, y) for the video region that is in 4:4:4 format, and wherein (x, y) indicates a coordinate of the chroma sample.

4. The method of claim 2, wherein the corresponding luma sample is located at (2x, 2y) for the video region that is in 4:2:0 format, and wherein (x, y) indicates a coordinate of the chroma sample.

5. The method of claim 1, wherein the conversion includes encoding the video into the bitstream.

6. The method of claim 1, wherein the conversion includes decoding the video from the bitstream.

7. An apparatus for processing video data comprising a processor and a non-transitory memory with instructions thereon, wherein the instructions upon execution by the processor, cause the processor to:
derive, for a conversion between a video region of a video and a bitstream of the video, a first offset used in a cross-component filtering tool for a chroma sample of the video, wherein the first offset is derived based on values of luma samples in a filter support region and filter coefficients, wherein the filter support region used for the cross-component filtering tool is a diamond shaped luma region;
derive a second offset used in the cross-component filtering tool for the chroma sample based on using a clipping operation to the first offset, wherein the second offset is clipped to a given range; and
perform the conversion by applying the cross-component filtering tool to refine the chroma sample by adding the second offset offset to a value of the chroma sample, wherein the value of the chroma sample is modified by a chroma adaptive loop filter process before a refinement by the cross-component filtering tool.

8. The apparatus of claim 7, wherein the first offset is derived based on applying filtering coefficients on luma sample differences, and
wherein each luma sample difference corresponds to a difference between a value of a luma sample in a filter support region and a value of a corresponding luma sample of the chroma sample.

9. The apparatus of claim 8, wherein the corresponding luma sample is located at (x, y) for the video region that is in 4:4:4 format, and wherein (x, y) indicates a coordinate of the chroma sample; or
wherein the corresponding luma sample is located at (2x, 2y) for the video region that is in 4:2:0 format, and wherein (x, y) indicates a coordinate of the chroma sample.

10. A non-transitory computer-readable storage medium storing instructions that cause a processor to:
derive, for a conversion between a video region of a video and a bitstream of the video, a first offset used in a cross-component filtering tool for a chroma sample of the video, wherein the first offset is derived based on values of luma samples in a filter support region and filter coefficients, wherein the filter support region used for the cross-component filtering tool is a diamond shaped luma region;
derive a second offset used in the cross-component filtering tool for the chroma sample based on using a clipping operation to the first offset, wherein the second offset is clipped to a given range; and
perform the conversion by applying the cross-component filtering tool to refine the chroma sample by adding the second offset offset to a value of the chroma sample, wherein the value of the chroma sample is modified by a chroma adaptive loop filter process before a refinement by the cross-component filtering tool.

11. The non-transitory computer-readable storage medium of claim 10, wherein the first offset is derived based on applying filtering coefficients on luma sample differences, and
wherein each luma sample difference corresponds to a difference between a value of a luma sample in a filter support region and a value of a corresponding luma sample of the chroma sample.

12. The non-transitory computer-readable storage medium of claim 11, wherein the corresponding luma sample is located at (x, y) for the video region that is in 4:4:4 format, and wherein (x, y) indicates a coordinate of the chroma sample; or
wherein the corresponding luma sample is located at (2x, 2y) for the video region that is in 4:2:0 format, and wherein (x, y) indicates a coordinate of the chroma sample.

13. A non-transitory computer-readable recording medium storing a bitstream of a video which is generated by a method performed by a video processing apparatus, wherein the method comprises:

deriving, for a video region of a video, a first offset used in a cross-component filtering tool for a chroma sample of the video region, wherein the first offset is derived based on values of luma samples in a filter support region and filter coefficients, wherein the filter support region used for the cross-component filtering tool is a diamond shaped luma region;

deriving a second offset used in the cross-component filtering tool for the chroma sample based on using a clipping operation to the first offset, wherein the second offset is clipped to a given range; and generating the bitstream by applying the cross-component filtering tool to refine the chroma sample by adding the second offset offset to a value of the chroma sample, wherein the value of the chroma sample is modified by a chroma adaptive loop filter process before a refinement by the cross-component filtering tool.

14. The non-transitory computer-readable recording medium of claim 13, wherein the first offset is derived based on applying filtering coefficients on luma sample differences, and wherein each luma sample difference corresponds to a difference between a value of a luma sample in a filter support region and a value of a corresponding luma sample of the chroma sample.

15. The non-transitory computer-readable recording medium of claim 14, wherein the corresponding luma sample is located at (x, y) for the video region that is in 4:4:4 format, and wherein (x, y) indicates a coordinate of the chroma sample; or wherein the corresponding luma sample is located at (2x, 2y) for the video region that is in 4:2:0 format, and wherein (x, y) indicates a coordinate of the chroma sample.

\* \* \* \* \*